US00RE50986E

(19) United States
(12) Reissued Patent
Park et al.

(10) Patent Number: US RE50,986 E
(45) Date of Reissued Patent: Aug. 11, 2026

(54) GATE DRIVING CIRCUIT AND DISPLAY DEVICE USING THE SAME

(71) Applicant: LG Display Co., Ltd., Seoul (KR)

(72) Inventors: Hae-Jun Park, Seoul (KR); Tae-Keun Lee, Paju-si (KR); Min-Su Kim, Daegu (KR); Se-Hwan Kim, Paju-si (KR); Young-Taek Hong, Gangneung-si (KR)

(73) Assignee: LG Display Co., Ltd., Seoul (KR)

(21) Appl. No.: 18/075,737

(22) Filed: Dec. 6, 2022

Related U.S. Patent Documents

Reissue of:
(64) Patent No.: 10,991,302
Issued: Apr. 27, 2021
Appl. No.: 16/918,882
Filed: Jul. 1, 2020

(30) Foreign Application Priority Data

Dec. 26, 2019 (KR) ..... 10-2019-0175347

(51) Int. Cl.
*G09G 3/3233* (2016.01)
*G09G 3/3266* (2016.01)
*G09G 3/3291* (2016.01)

(52) U.S. Cl.
CPC ..... *G09G 3/3233* (2013.01); *G09G 3/3266* (2013.01); *G09G 3/3291* (2013.01)

(58) Field of Classification Search
CPC ... G09G 3/3233; G09G 3/3291; G09G 3/3266
See application file for complete search history.

(56) References Cited

U.S. PATENT DOCUMENTS 7,190,338 B2 3/2007 Kubota et al.
7,339,570 B2 3/2008 Kubota et al.
9,171,505 B2 10/2015 Lee et al.
9,490,276 B2 11/2016 Kim et al.
(Continued)

FOREIGN PATENT DOCUMENTS

CN 1323025 A 11/2001
CN 101783117 A 7/2010
(Continued)

OTHER PUBLICATIONS

China National Intellectual Property Administration, Notice of Allowance, Chinese Patent Application No. 202011557716.3, Jan. 5, 2024, 10 pages.
(Continued)

*Primary Examiner* — My Trang Ton
(74) *Attorney, Agent, or Firm* — Fenwick & West LLP

(57) ABSTRACT

A display device according to the present disclosure comprises a substrate including a display area and a non-display area, pixel circuits each including at least one n-type transistor and at least one p-type transistor and arranged in the display area, and a gate driving circuit included in the non-display area and outputting a first scan signal for applying a data voltage to driving transistors of the pixel circuits for an initialization time and a second scan signal that represents a same logic voltage as the first scan signal for the initialization time and represents a logic voltage reverse to the first scan signal for a sampling time. A first scan signal generator and a second scan signal generator are integrated using nodes Q/QB of a logic circuit to reduce a bezel size.

23 Claims, 14 Drawing Sheets

(56) References Cited

U.S. PATENT DOCUMENTS

| | | | | |
|---|---|---|---|---|
| 9,847,053 | B2 | 12/2017 | Hu et al. | |
| 10,235,926 | B2 | 3/2019 | In et al. | |
| 10,475,386 | B2 | 11/2019 | Kim | |
| 10,706,786 | B2 | 7/2020 | Jang et al. | |
| 10,991,302 | B1 | 4/2021 | Park et al. | |
| 2002/0075249 | A1 | 6/2002 | Kubota et al. | |
| 2004/0164785 | A1 | 8/2004 | Metzler | |
| 2005/0243588 | A1 | 11/2005 | Kubota et al. | |
| 2007/0146354 | A1 | 6/2007 | Kubota et al. | |
| 2010/0177089 | A1 | 7/2010 | Huang | |
| 2013/0249884 | A1 | 9/2013 | Kim et al. | |
| 2014/0002424 | A1 | 1/2014 | Lee et al. | |
| 2014/0253531 | A1* | 9/2014 | Lee | G09G 3/3677 345/212 |
| 2015/0243220 | A1 | 8/2015 | Kim et al. | |
| 2017/0092200 | A1* | 3/2017 | Park | G09G 3/3266 |
| 2017/0140697 | A1 | 5/2017 | In et al. | |
| 2017/0229055 | A1 | 8/2017 | Hu et al. | |
| 2018/0151125 | A1* | 5/2018 | Lee | G09G 3/3233 |
| 2018/0174517 | A1* | 6/2018 | Lee | G09G 3/3233 |
| 2019/0005883 | A1 | 1/2019 | Kim | |
| 2019/0035322 | A1* | 1/2019 | Kim | H10D 86/60 |
| 2019/0130842 | A1 | 5/2019 | Jang et al. | |
| 2019/0180690 | A1 | 6/2019 | Kim et al. | |
| 2020/0020280 | A1* | 1/2020 | Han | G09G 3/3266 |
| 2020/0251044 | A1* | 8/2020 | Lin | H03K 19/0019 |

FOREIGN PATENT DOCUMENTS

| | | | | |
|---|---|---|---|---|
| CN | 103514835 | A | | 1/2014 |
| CN | 107068030 | A | | 8/2017 |
| CN | 109523969 | A | | 3/2019 |
| CN | 107301839 | | * | 4/2022 |
| JP | 2001-100700 | A | | 4/2001 |
| KR | 10-2013-0107528 | A | | 10/2013 |
| KR | 10-2015-0059604 | A | | 6/2015 |
| KR | 10-2015-0100516 | A | | 9/2015 |
| KR | 10-2018-0019433 | A | | 2/2018 |
| KR | 10-2019-0049274 | A | | 5/2019 |
| KR | 10-2019-0070037 | A | | 6/2019 |
| KR | 10-2021-0082904 | A | | 7/2021 |
| TW | I575491 | B | | 3/2017 |
| TW | 201729169 | A | | 8/2017 |
| TW | 201729173 | A | | 8/2017 |
| TW | 201905882 | A | | 2/2019 |

OTHER PUBLICATIONS

Korean Intellectual Property Office, Office Action, Korean Patent Application No. 10-2019-0175347, Feb. 27, 2024, 11 pages.
Taiwan Intellectual Property Office, Office Action, Taiwanese Patent Application No. 111118273, May 27, 2024, eight pages.
Taiwan Intellectual Property Office, Office Action, Taiwanese Patent Application No. 111118273, Nov. 22, 2023, six pages.
Korean Intellectual Property Office, Office Action, Korean Patent Application No. 10-2025-0006687, Jul. 22, 2025, 13 pages.

* cited by examiner

GATE DRIVING CIRCUIT AND DISPLAY DEVICE USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 10,991,302 issued on Apr. 27, 2021, which was filed as U.S. patent application Ser. No. 16/918,882 on Jul. 1, 2020, which* claims priority from Republic of Korea Patent Application No. 10-2019-0175347, filed on Dec. 26, 2019, which is hereby incorporated by reference in its entirety.

BACKGROUND

Field

The present disclosure relates to a gate driving circuit and a display device using the same, and more specifically, to a gate driving circuit and a display device using the same for realizing a display device with a narrow bezel by integrating a first scan signal generator and a second scan signal generator using nodes Q/QB of logic circuits.

Description of the Related Art

Currently, various display devices are being developed and have entered the market. For example, there are display devices such as a liquid crystal display (LCD) device, a field emission display (FED) device, an electrophoretic display (EPD) device, an electrowetting display (EWD) device, an organic light emitting display (OLED) device, and a quantum dot display (QD) device.

In the development of various technologies for realizing display devices and mass production of various products, technical enhancement is achieved on the basis of technology for realizing designs that consumers desire rather than technology for operating display devices. One technology to this end is increasing a display screen size. This is for the purpose of reducing a non-display area surrounding a display screen, that is, a bezel, and increasing the size of a display area to improve the immersiveness of a user for the display screen and diversify product design.

In the bezel, driving circuits for transmitting driving signals to a pixel array constituting the display screen are arranged.

When signals supplied from the driving circuits drive pixel circuits, the pixel array emits light. A gate driving circuit is provided to transmit gate signals to gate lines of pixel circuits. A data driving circuit is provided to transmit data signals to data lines of the pixel circuits. The gate driving circuit may include a scan driving circuit for controlling data electrodes of scan transistors or switching transistors of pixel circuits and an emission driving circuit for controlling gate electrodes of emission switching transistors.

A scan driving circuit of a conventional gate driving circuit uses separate drivers for output of a first scan signal for determining whether a data voltage will be transferred to a driving transistor and a second scan signal for compensating for the driving transistor. The size of a bezel increases because the two scan drivers are provided.

A technology for reducing the bezel by reducing the area in which a gate driving circuit is arranged is required.

SUMMARY

The present disclosure is to provide a gate driving circuit and a display device using the same which can realize a narrow bezel.

The present disclosure is to provide a gate driving circuit and a display device using the same which can secure a driving initialization time of a driving transistor.

To achieve these objects and other advantages and in accordance with the purpose of the invention, as embodied and broadly described herein, a gate driving circuit includes a first scan signal generator and a second scan signal generator which are integrated using nodes Q/QB of a logic circuit.

There is provided a gate driving circuit according to the present disclosure which comprises a logic signal generator including a node Q and a node QB outputting a logic signal reverse to a logic signal of the node Q and outputting a carry signal, and a scan signal generator in which a first scan signal generator for generating a first scan signal for applying a data voltage to driving transistors of pixel circuits for an initialization time by sharing the node Q and the node QB of the logic signal generator is integrated with a second scan signal generator for generating a second scan signal representing the same logic voltage signal as the first scan signal for the initialization time and representing a logic voltage signal reverse to the first scan signal for a sampling time by sharing the node Q and the node QB of the logic signal generator.

The gate driving circuit according to the present disclosure may have an initialization time of 4 horizontal periods and a sampling time of 1 horizontal period using 6-phase clock signals.

The gate driving circuit according to the present disclosure may have an initialization time of 6 horizontal periods and a sampling time of 1 horizontal period using 8-phase clock signals.

The gate driving circuit according to the present disclosure may include the logic signal generator including a first transistor having a gate electrode connected to the node Q and a second transistor serially connected to the first transistor and having a gate electrode connected to the node QB and outputting a carry pulse signal through a node shared by the first transistor and the second transistor. The first scan signal generator may include a third transistor having a gate electrode connected to the node Q and a fourth transistor serially connected to the third transistor and having a gate electrode connected to the node QB and output the first scan signal through a node shared by the third transistor and the fourth transistor. And the second scan signal generator may include a fifth transistor having a gate electrode connected to the node Q and a sixth transistor serially connected to the fifth transistor and having a gate electrode connected to the node QB and output the second scan signal through a node shared by the fifth transistor and the sixth transistor.

All transistors in the gate driving circuit according to the present disclosure may be p-type transistors.

In the gate driving circuit according to the present disclosure, a first clock signal may be supplied to one terminal of the first transistor, a second high-level voltage may be supplied to one terminal of the second transistor, a first high-level voltage may be supplied to one terminal of the third transistor, a first low-level voltage may be supplied to one terminal of the fourth transistor, a fourth clock signal may be supplied to one terminal of the fifth transistor, and the second high-level voltage may be supplied to one terminal of the sixth transistor.

In the gate driving circuit according to the present disclosure, a capacitor may be disposed between a connecting point of the node Q and the gate electrode of the fifth transistor and the node shared by the fifth transistor and the sixth transistor.

The first scan signal generator of the gate driving circuit according to the present disclosure may include a first signal transmission transistor having a source electrode connected to the node Q and a drain electrode connected to the gate electrode of the third transistor and turned on all the time by receiving a second low-level voltage through a gate electrode, and the second scan signal generator may include a second signal transmission transistor having a source electrode connected to the node Q and a drain electrode connected to the gate electrode of the fifth transistor and turned on all the time by receiving the second low-level voltage through a gate electrode.

In the gate driving circuit according to the present disclosure, the logic signal generator, the first scan signal generator and the second scan signal generator may output a high-level voltage when first to fifth clock signals CLK1 to CLK5 are a low-level voltage and a start pulse signal VST and a sixth clock signal CLK6 are the low-level voltage, the logic signal generator may output the low-level voltage and the first scan signal generator and the second scan signal generator may output the high-level voltage when the first clock signal CLK1 is the low-level voltage and the start pulse signal VST and the second to sixth clock signals CLK2 to CLK6 are the high-level voltage, the logic signal generator and the first scan signal generator may output the high-level voltage and the second scan signal generator may output the high-level voltage when the fourth clock signal CLK4 is the low-level voltage and the start pulse signal VST, the first to third clock signals CLK1 to CLK3 and the fifth and sixth clock signals CLK5 and CLK6 are the high-level voltage, and the logic signal generator and the second scan signal generator may output the high-level voltage and the first scan signal generator may output the low-level voltage when the fifth clock signal CLK5 is the low-level voltage and the start pulse signal VST, the first to fourth clock signals CLK1 to CLK4 and the sixth clock signal CLK6 are the high-level voltage.

A display device according to the present disclosure comprises a substrate including a display area and a non-display area, pixel circuits each including a driving transistor for transferring current necessary to operate a light-emitting diode according to a switching operation and arranged in the display area, and a gate driving circuit included in the non-display area and including a first scan signal generator and a second scan signal generator which are integrated using nodes Q/QB of a logic circuit.

In the display device according to the present disclosure, each pixel circuit may include at least one oxide semiconductor transistor and at least one polysilicon transistor.

In the display device according to the present invention, each pixel circuit may include a first scan transistor configured to receive a first scan signal and apply the first scan signal to a gate electrode of the driving transistor, and a second scan transistor configured to receive a second scan signal and perform a switching operation for compensating for the driving transistor.

In the display device according to the present disclosure, the first scan transistor may be an oxide transistor and the second scan transistor may be a silicon transistor.

In the display device according to the present disclosure, the driving transistor may be an oxide transistor or a silicon transistor.

In the display device according to the present disclosure, the driving transistor may have a channel formed of a semiconductor oxide.

In the display device according to the present disclosure, the second scan transistor may be a p-type or n-type metal-oxide-semiconductor silicon transistor or an n-type metal-oxide-semiconductor silicon transistor.

According to the gate driving circuit and the display device using the same of the present disclosure, it is possible to reduce the size of a bezel by integrating SC1 and SC2 drivers and to secure a sufficient initialization time using 6-phase clock signals.

The foregoing general description and the following detailed description of the present disclosure do not specify essential features of the claims and thus the scope of the claims is not limited by the description.

DETAILED DESCRIPTION

Figure 1:
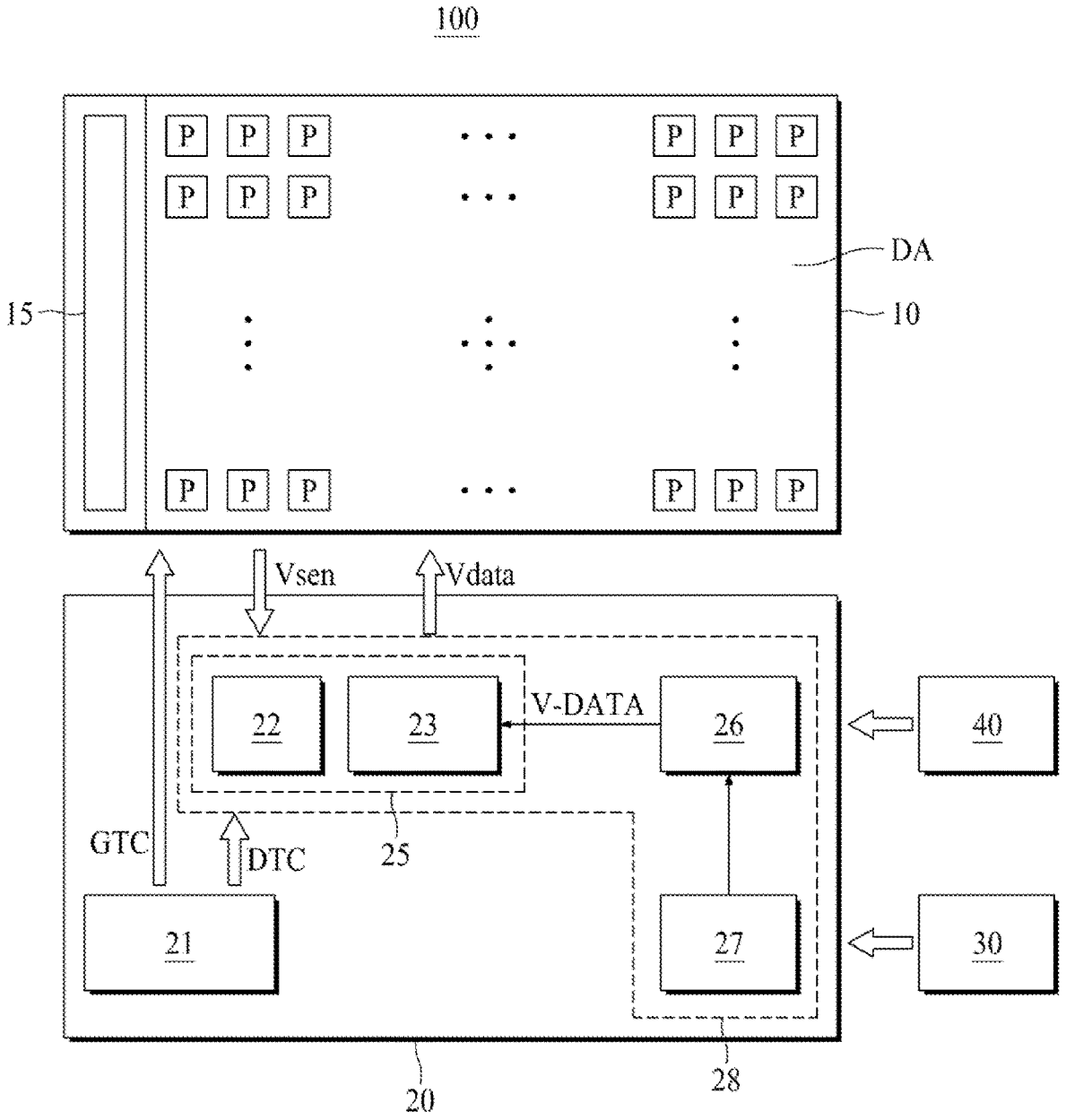
FIG. 1 is a block diagram schematically showing a configuration of a display device according to an embodiment of the present disclosure.

For embodiments of the present disclosure disclosed in the description, specific structural and functional descriptions are exemplified for the purpose of describing embodiments of the present disclosure, and embodiments of the present invention can be implemented in various forms and are not to be considered as a limitation of the invention.

The present disclosure can be modified in various manners and have various forms and specific embodiments will be described in detail with reference to the drawings. However, the disclosure should not be construed as limited to the embodiments set forth herein, but on the contrary, the disclosure is to cover all modifications, equivalents, and alternatives falling within the spirit and scope of the embodiments.

While terms, such as "first", "second", etc., may be used to describe various components, such components must not be limited by the above terms. The above terms are used only to distinguish one component from another. For example, a first component may be referred to as a second component and the second component may be referred to as the first component without departing from the scope of the present invention.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements. Other representations for describing a relationship between elements, that is, "between", "immediately between", "in proximity to", "in direct proximity to" and the like should be interpreted in the same manner.

The terms used in the specification of the present invention are merely used in order to describe particular embodiments, and are not intended to limit the scope of the present invention. An element described in the singular form is intended to include a plurality of elements unless the context clearly indicates otherwise.

In the specification of the present invention, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Unless otherwise defined, all terms including technical and scientific terms used herein have the same meaning as commonly understood by one of ordinary skill in the art to which example embodiments pertain. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Meanwhile, when a certain embodiment can be implemented in a different manner, a function or an operation specified in a specific block may be performed in a different sequence from that specified in a flowchart. For example, two consecutive blocks may be simultaneously executed or reversely executed according to related function or operation.

Hereinafter, a gate driving circuit and a display device using the same according to the present disclosure will be described with reference to the attached drawings.

In the following description, a pixel circuit and a gate driving circuit formed on a substrate of a display panel may be implemented by n-type or p-type transistors. For example, a transistor may be implemented by a MOSFET (metal oxide semiconductor field effect transistor). The transistor is a three-electrode element including a gate, a source and a drain. The source is an electrode that provides carriers to the transistor. Carriers flow from the source in the transistor. The drain is an electrode through which carriers are emitted in the transistor. For example, carriers flow from the source to the drain in the transistor. In the case of the n-type transistor, carriers are electrons and thus a source voltage is lower than a drain voltage such that the electrons can flow from the source to the drain. Since electrons flow from the source to the drain in the n-type transistor, current flows from the drain to the source. In the case of the p-type transistor, carriers are holes and thus a source voltage is higher than a drain voltage such that the holes can flow from the source to the drain. Since holes flow from the source to the drain in the p-type transistor, current flows from the source to the drain. The source and the drain of a transistor are not fixed and may be interchanged according to voltages applied thereto.

A turn-on voltage of the p-type transistor may be a low-level voltage VL and a turn-off voltage thereof may be a high-level voltage VH. A turn-on voltage of the n-type transistor may be a high-level voltage and a turn-off voltage thereof may be a low-level voltage.

FIG. 1 is a block diagram showing a display device according to an embodiment of the present disclosure. Here, FIG. 1 is a block diagram showing an exemplary display device in which pixel circuits that can be externally compensated are arranged and components of the display device are not limited thereto.

The display device 10 includes a display panel 10, a drive integrated circuit (IC) 20, a memory 30, and the like.

A screen displaying an input image in the display panel 10 includes a plurality of pixels P connected to signal lines. Although the pixels P may include red, green and blue sub-pixels for color representation, the present disclosure is not limited thereto and the pixels P may further include white sub-pixels. An area in which the pixels P are arranged to display images is referred to as a display area (DA) and an area other than the display area DA is referred to as a non-display area, and the non-display area may be called a bezel.

Signal lines may include data lines through which an analog data voltage Vdata is provided to the pixels P and gate lines through which a gate signal is provided to the pixels P. The gate signal may include two or more signals according to pixel circuit configuration. In a pixel circuit which will be described below, the gate signal includes a first scan signal SC1, a second scan signal SC2 and an emission signal EM. The signal lines may further include sensing lines used to sense electrical characteristics of the pixels P.

The pixels P of the display panel 10 are arranged in a matrix form to constitute a pixel array, but the present invention is not limited thereto. The pixels P can be arranged in various forms such as a pixel sharing form, a stripe form, and a diamond form in addition to the matrix form. Each pixel P can be connected to any one of the data lines, any one of the sensing lines, and at least one of the gate lines. Each pixel P is provided with a high-level power supply voltage and a low-level power supply voltage from a power generator. The power generator can provide the high-level power supply voltage to the pixels P through a high-level power supply voltage line. In addition, the power generator can provide the low-level power supply voltage to the pixels P through a low-level power supply voltage line. The power generator may be included in the drive IC 20. The drive IC 20 modules input image data into a predetermined compensation value of a pixel P on the basis of an electrical characteristic sensing result of the pixel P. The drive IC 20 includes a data driving circuit 28 which generates a data voltage corresponding to modulated data V-DATA and a timing controller 21 which controls operation timings of the data driving circuit 28 and a gate driving circuit 15. The data driving circuit 28 of the drive IC 20 generates compensated data by adding a predetermined compensation value to input image data. The data driving circuit 28 converts the compensated data into a data voltage Vdata and supplies the data voltage Vdata to the data lines. The data driving circuit 28 includes a data driver 25, a compensator 26, a compensation memory 27, and the like.

The data driver 25 may include a sensor 22 and a data voltage generator 23, but the present disclosure is not limited thereto.

The timing controller 21 can generate timing signals from video signals input from a host system 40. For example, the timing controller 21 can generate a gate timing control signal GTC for controlling an operation timing of the gate driving circuit 15 and a data timing control signal DTC for controlling an operation timing of the data driver 25 on the basis of a vertical synchronization signal, a horizontal synchronization signal, a dot clock signal, and a data enable signal.

The data timing control signal DTC may include a source start pulse signal, a source sampling clock signal, and a source output enable signal, but the present invention is not limited thereto. The source start pulse signal controls a data sampling start timing of the data voltage generator 23. The source sampling clock signal is a clock signal that controls a data sampling timing on the basis of rising or falling edges. The source output enable signal controls an output timing of the data voltage generator 23.

The gate timing control signal GTC may include a gate start pulse signal and a gate shift clock signal, but the present disclosure is not limited thereto. The gate start pulse signal is applied to a stage that generates the first output to activate the operation of the stage. The gate shift clock signal is a clock signal commonly input to stages and shifts the gate start pulse signal.

The data voltage generator 23 generates a data voltage Vdata of an input image using a digital-analog converter (DAC) that converts a digital signal into an analog signal in a normal driving mode in which an input image is reproduced on a screen and supplies the data voltage Vdata to the pixels P through the data lines.

In a sensing mode for measuring electrical characteristic deviations of pixels P before product shipping or during operation of products, the data voltage generator 23 converts test data received from a grayscale-luminance measurement system to generate a data voltage for sensing. The data voltage generator 23 supplies the data voltage for sensing to a sensing target pixel P of the display panel 10 through data lines. The grayscale-luminance measurement system senses electrical characteristics of the pixels P. The grayscale-luminance measurement system derives compensation values of the pixels P which compensate for electrical characteristic deviations of the pixels P, particularly, threshold voltage deviations of driving transistors on the basis of a sensing result. The grayscale-luminance measurement system stores the compensation values of the pixels P in the memory 30 or updates pre-stored values. The memory 30 may be implemented as the compensation memory 27 and a single memory. Further, the memory 30 may be a flash memory, but the present invention is not limited thereto.

The grayscale-luminance measurement system can be electrically connected to the memory 30 in a sensing mode operation.

When power is applied to the display device 10 in the normal driving mode, a compensation value from the memory 30 is loaded into the compensation memory 27 of the drive IC 20. The compensation memory 27 of the drive IC 20 may be a DDR SDRAM or an SRAM, but the present invention is not limited thereto.

The sensor 22 can sample a source voltage of a driving transistor according to current of the driving transistor to sense electrical characteristics of the driving transistor. The sensor 22 may be configured to sense electrical characteristics of each pixel P and transmit the electrical characteristics to the grayscale-luminance measurement system in an aging process before product shipping.

The compensator 26 modulates input image data using the compensation value read from the compensation memory 27 and transmits the modulated data V-DATA to the data voltage generator 23.

Figure 2A:
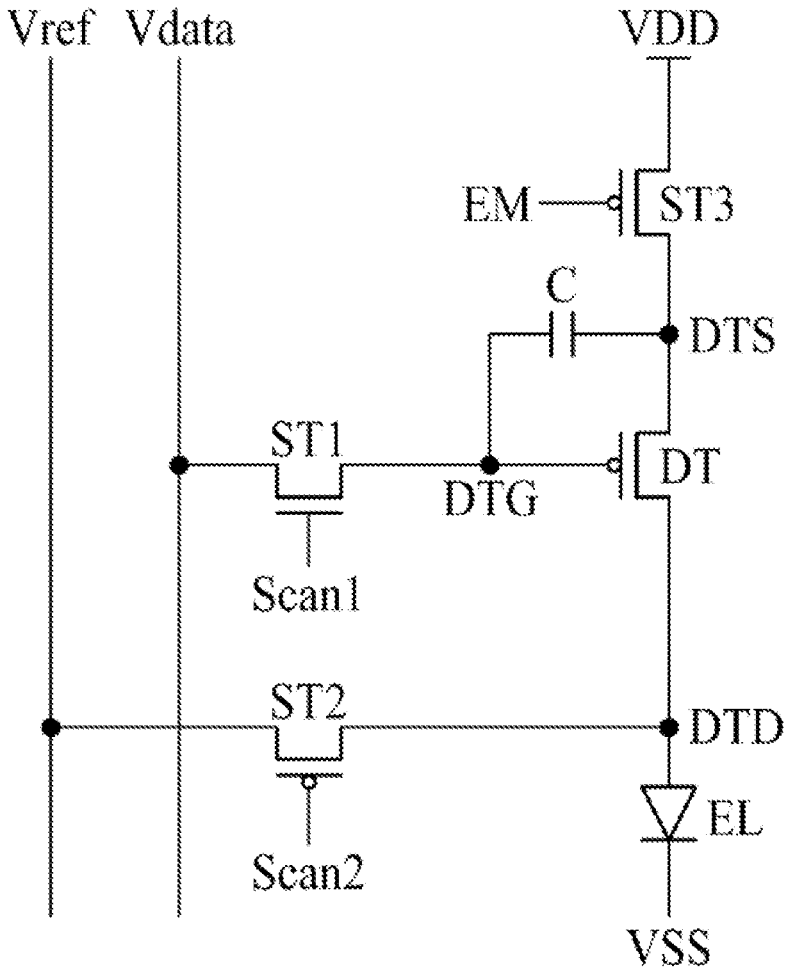
FIG. 2A is a circuit diagram schematically showing a pixel circuit of the display device according to an embodiment of the present disclosure.

FIG. 2A is a circuit diagram showing a pixel circuit of the display device according to an embodiment of the present invention. The pixel circuit of FIG. 2A may include an emission element EL, a driving transistor DT, a capacitor C, a first scan transistor ST1, a second scan transistor ST2, and an emission switching transistor ST3. The first scan transistor ST1, the second scan transistor ST2, the emission switching transistor ST3 and the driving transistor DT of the pixel circuit are implemented as two types of transistors. For example, transistor types may include an n type and a p type, and an oxide semiconductor transistor and a polysilicon transistor. The first scan transistor ST1 may be implemented as an n-type transistor, and the driving transistor, the second scan transistor ST2 and the emission switching transistor ST3 may be implemented as p-type transistors. Although a pixel circuit in which only the first scan transistor ST1 is implemented as an n-type transistor is exemplified in FIG. 2A, the present disclosure is not limited thereto.

The first scan transistor ST1 of the pixel circuit according to an embodiment of the present disclosure may be an oxide transistor and the second transistor ST2 may be a silicon transistor. Alternatively, the second scan transistor may be a p-type metal-oxide-semiconductor silicon transistor or an n-type metal-oxide-semiconductor silicon transistor.

In addition, the driving transistor DT may be configured as an oxide transistor or a silicon transistor. The driving transistor DT may include a channel formed of a semiconductor oxide.

Although an externally and internally compensated pixel circuit composed of four transistors and one capacitor is exemplified in FIG. 2A, the present disclosure is not limited thereto and the pixel circuit may be an internally compensated or externally compensated pixel circuit composed of two types of n-type and p-type transistors.

In FIG. 2A, the threshold voltage of the driving transistor DT can be compensated through an external compensation method and mobility deviation of the driving transistor can be compensated through an internal compensation method.

As described above, the first scan transistor ST1 may be an oxide transistor including an oxide semiconductor layer having a small off current. Off current is a leakage current flowing between the source and the drain of a transistor in a state in which the transistor is turned off. A transistor element having a small off current has a small leakage current even if it is in an off state for a long time, and thus luminance variations in pixels can be reduced when the pixels are driven at a low speed. For example, low-speed driving may be driving at 1 Hz.

The driving transistor DT, the second scan transistor ST2 and the emission switching transistor ST3 may be polysilicon transistors including a semiconductor layer formed of low temperature polysilicon (LTPS) with high mobility.

In the display device of the present disclosure, a frame rate can be reduced, and pixels are driven at a low speed in order to reduced power consumption in still images. In this case, a data update period increases and thus flicker may occur when a leakage current is generated in pixels. A user can perceive flicker when the luminance of pixels periodically changes.

If the first scan transistor ST1 with a long off period is used as a transistor including an oxide semiconductor layer with a small off current, the leakage current decreases in low-speed driving and thus flicker can be prevented.

Referring to FIG. 2A, a first scan signal SC1, a second scan signal SC2, and an emission signal EM are applied to the pixel circuit. The first scan signal SC1, the second scan signal SC2 and the emission signal EM swing between the high-level voltage VH and the low-level voltage VL.

The emission element EL includes an organic compound layer formed between an anode and a cathode. The organic compound layer may include a hole injection layer (HIL), a hole transport layer (HTL), an emission layer (EML), an electron transport layer (ETL) and an electron injection layer (EIL), but the present disclosure is not limited thereto. The cathode of the emission element EL is provided with a low-level power supply voltage VSS and the anode is connected to a drain electrode of the driving transistor.

The driving transistor DT is a driving element that controls current flowing through the emission element EL according to a gate-source voltage. The driving transistor DT includes a gate electrode connected to a first node DTG, a drain electrode connected to a second node DTD, and a source electrode connected to a third node DTS. The first node DTG is connected to the gate electrode of the driving transistor DT, one electrode of the capacitor C, and the source element of the first scan transistor ST1. The capacitor C is connected between the first node DTG and the third node DTS. A high-level power supply voltage VDD is applied to the driving transistor DT through the third node DTS.

The first scan transistor ST1 includes a gate electrode to which the first scan signal SC1 is applied, a drain electrode to which a data voltage Vdata is applied, and a source electrode connected to the gate electrode of the driving transistor DT through the first node DTG.

The second scan transistor ST2 is turned on according to the second scan signal SC2 to form a current path between a sensing line and the second node DTD. The second scan transistor ST2 includes a gate electrode to which the second scan signal SC2 is applied, a source electrode to which a reference voltage Vref is applied, and a drain electrode connected to the drain electrode of the driving transistor DT and the anode of the emission element EL through the second node DTD. The reference voltage Vref is lower than the high-level power supply voltage VDD and the data voltage Vdata.

The emission switching transistor ST3 includes a gate electrode to which the emission signal EM is applied, a drain electrode connected to the source electrode of the driving transistor DT through the third node DTS, and a source electrode to which the high-level power supply voltage VDD is applied through the high-level power supply voltage line.

The emission switching transistor ST3 is connected between the high-level power supply voltage line through which the high-level power supply voltage VDD is supplied and the source electrode of the driving transistor DT and switches a current path between the high-level power supply voltage line and the driving transistor DT in response to the emission signal EM.

Figure 2B:
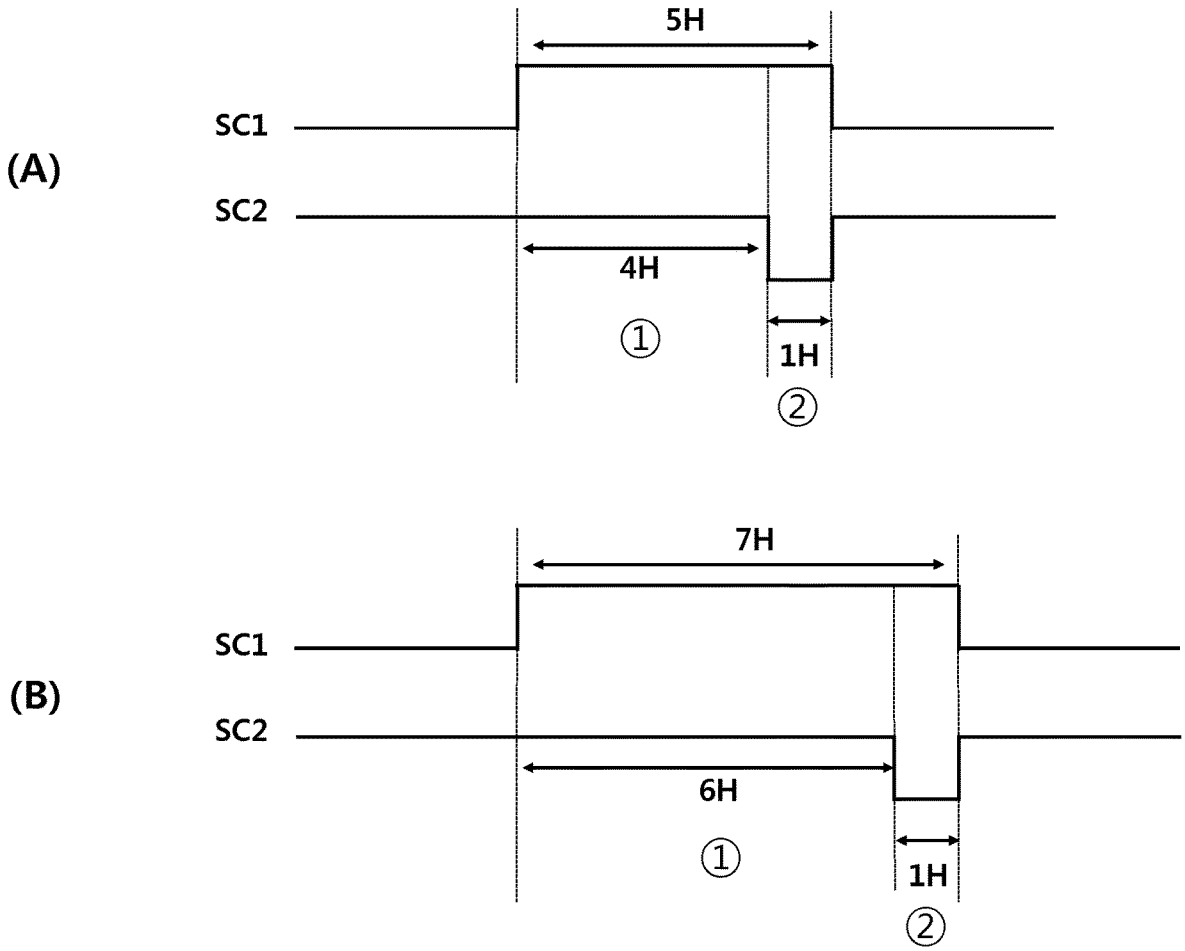
FIG. 2B shows scan signal waveforms provided to the pixel circuit shown in FIG. 2A according to an embodiment of the present disclosure.

FIG. 2B is a diagram showing scan signal waveforms supplied to the pixel circuit shown in FIG. 2A. In FIG. 2B (A) and FIG. 2B (B), 1H represents 1 horizontal period in which data is written to a pixel.

FIG. 2B (A) shows a case in which a logic signal is generated using 6-phase clock signals. The first scan signal SC1 is a transistor turn-on voltage for 5 horizontal periods 5H and the second scan signal SC2 is a transistor turn-on voltage for 1 horizontal period 1H.

FIG. 2B (B) shows a case in which a logic signal is generated using 8-phase clock signals. The first scan signal SC1 is a transistor turn-on voltage for 7 horizontal periods 7H and the second scan signal SC2 is a transistor turn-on voltage for 1 horizontal period 1H. The second scan signal SC2 is the same logic voltage signal as the first scan signal SC1 for an initialization time ① and a logic voltage inverted from the first scan signal SC1 for a sampling time ②.

The first scan signal SC1 is applied to the gate electrode of the first scan transistor ST1 as the high-level voltage VH for 4 horizontal periods 4H or 6 horizontal periods 6H corresponding to the initialization time ①. Accordingly, the first scan transistor ST1 is turned on. The second scan signal SC2 is also the high-level voltage VH and the second scan transistor ST2 is turned off for the 4 horizontal periods 4H or the 6 horizontal periods 6H. The data voltage Vdata supplied through the drain electrode of the first scan transistor ST1 passes through the first node DTG connected to the gate electrode of the driving transistor DT and is charged in the capacitor C disposed between the first node DTG and the third node DTS.

After lapse of the initialization time ①, the second scan transistor SC2 switches to the low-level voltage VL and is applied to the gate electrode of the second scan transistor ST2 so that the second scan transistor ST2 is turned on in the sampling time ② for 1 horizontal period 1H. The reference voltage Vref supplied through the drain electrode of the second scan transistor ST2 is applied to the second node DTD connected to the source electrode of the driving transistor DT.

Figure 3:
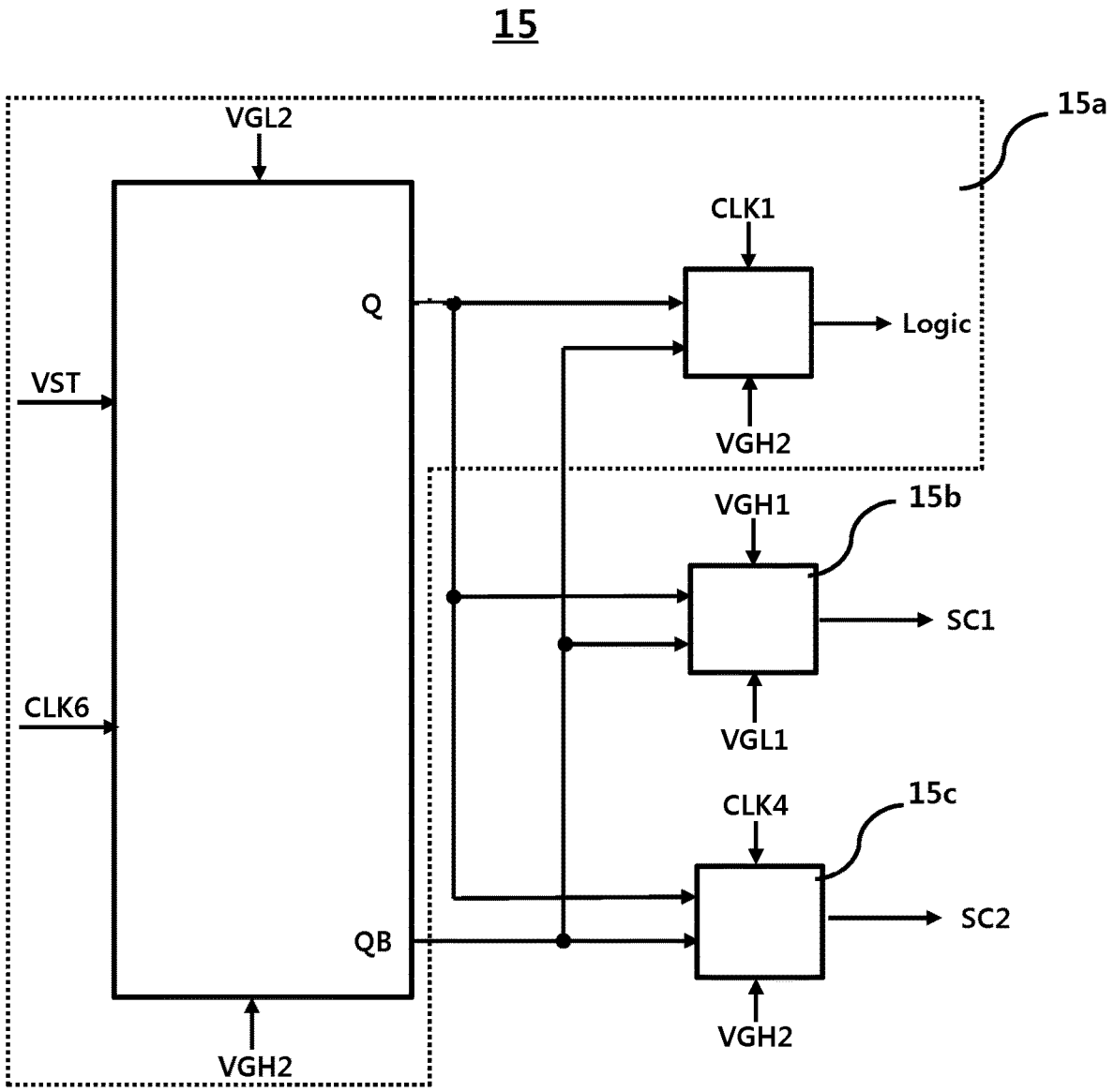
FIG. 3 is a block diagram schematically showing a configuration of a gate driving circuit according to an embodiment of the present disclosure.

FIG. 3 is a diagram showing a configuration of a scan signal generator in the configuration of the gate driving circuit according to the present disclosure. The gate driving circuit may include an emission signal generator that generates the emission signal EM in addition to the scan signal generator.

As shown, the gate driving circuit 15 according to the present disclosure includes a logic signal generator 15a, a first scan signal generator 15b that shares a node Q and a node QB of the logic signal generator 15a and generates the first scan signal SC1, and a second scan signal generator 15c that shares the node Q and the node QB of the logic signal generator 15a and generates the second scan signal SC2.

The logic signal generator 15a receives a start pulse signal VST, a second high-level voltage VGH2, a second low-level voltage VGL2, and a first clock signal CLK1 and outputs a carry signal Logic.

The first scan signal generator 15b shares the node Q and the node QB of the logic signal generator 15a, receives a first high-level voltage VGH1 and a first low-level voltage VGL1 and outputs the first scan signal SC1.

The second scan signal generator 15c shares the node Q and the node QB of the logic signal generator 15a, receives the second high-level voltage VGH2 and a fourth clock signal CK4 and outputs the second scan signal SC2.

Figure 4:
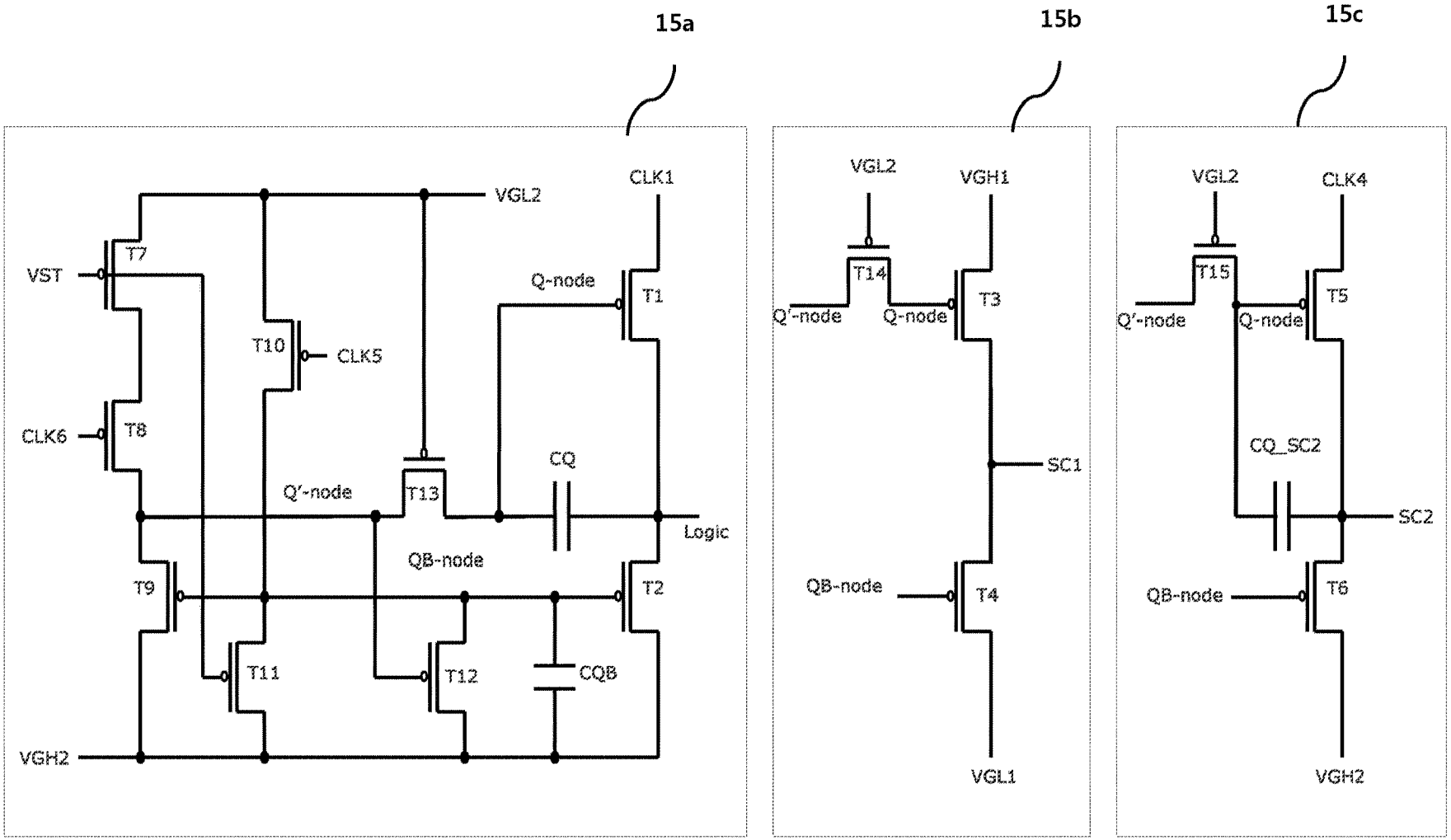
FIG. 4 is a circuit diagram showing the configuration of the gate driving circuit according to an embodiment of the present disclosure in detail.

FIG. 4 is a diagram showing the configuration of the scan signal generator of FIG. 3 in detail.

The logic signal generator 15a includes first and second transistors T1 and T2, seventh to thirteenth transistors T7 to T13, and first and second bootstrap capacitors CQ and CQB. The first and second transistors T1 and T2 from among the first to thirteenth transistors T1 to T13 output a carry pulse signal Logic for starting operation of a shift register subsequent thereto through a node shared thereby.

The first transistor T1 includes a gate electrode connected to a node Q, a source electrode connected to a first clock supply line, and a drain electrode connected to a carry pulse output node. The first transistor T1 is turned on or turned off in response to the electric potential of the node Q Q-node to output a logic voltage of the first clock signal CLK1 through an output node or to block the logic voltage.

The second transistor T2 includes a gate electrode connected to a node QB, a source electrode connected to a second-high voltage supply line, and a drain electrode connected to the carry pulse output node. The second transistor T2 is turned on or turned off in response to the electric potential of the node QB to output the second high-level voltage VGH2 supplied through the second high-level voltage line through an output node or to block the second high-level voltage VGH2.

The seventh transistor T7 includes a gate electrode connected to a start pulse line, a source electrode connected to a second low-level voltage line, and a drain electrode connected to the source electrode of the eighth transistor T8. The seventh transistor T7 is turned on or turned off in response to the electric potential of the start pulse signal VST supplied through the start pulse line to transfer the second low-level voltage VGL2 supplied through the second low-level voltage line through the drain electrode or block the second low-level voltage VGL2.

The eighth transistor T8 includes a gate electrode connected to a sixth clock supply line, the source electrode connected to the drain electrode of the seventh transistor T7, and a drain electrode connected to a node Q'. The eighth transistor T8 is turned on or turned off in response to the electric potential of a sixth clock signal CLK6 supplied through the sixth clock supply line to transfer the second low-level voltage VGL2 supplied through the second low-level voltage line and transferred from the seventh transistor T7 to the node Q' or to block the second low-level voltage VGL2.

The ninth transistor T9 includes a gate electrode connected to the node QB, a source electrode connected to the second high-level voltage line, and a drain electrode connected to the node Q'. The ninth transistor T9 is turned on or turned off in response to the electric potential of the node QB to transfer the second high-level voltage VGH2 supplied through the second high-level voltage line or to block the second high-level voltage VGH2.

The tenth transistor T10 includes a gate electrode connected to a fifth clock line, a source electrode connected to the second low-level voltage line, and a drain electrode connected to the node QB QB-node. The tenth transistor T10 is turned on or turned off in response to the electric potential of a fifth clock signal CLK5 supplied through the fifth clock line to transfer the second low-level voltage VGL2 supplied through the second low-level voltage line to the node QB QB-node or to block the second low-level voltage VGL2.

The eleventh transistor T11 includes a gate electrode connected to the start pulse line, a source electrode connected to the second high-level voltage line, and a drain electrode connected to the node QB. The eleventh transistor T11 is turned on or turned off in response to the electric potential of the start pulse signal VST supplied through the start pule line to transfer the second high-level voltage VGH2 supplied through the second high-level voltage line to the node QB or to block the second high-level voltage VGH2.

The twelfth transistor T12 includes a gate electrode connected to the node Q', a source electrode connected to the second high-level voltage line, and a drain electrode connected to the node QB. The twelfth transistor T12 is turned on or turned off in response to the electric potential of the node Q' to transfer the second high-level voltage VGH2 supplied through the second high-level voltage line or to block the second high-level voltage VGH2.

The thirteenth transistor T13 includes a gate electrode connected to the second low-level voltage line, a source electrode connected to the node Q', and a drain electrode connected to the node Q. The thirteenth transistor T13 is turned on all the time according to the second low-level voltage VGH2 supplied through the second low-level voltage line to transfer the logic voltage of the node Q' to the node Q.

One end of the first bootstrap capacitor CQ is connected to the node Q and the other end is connected to the carry pulse output node. Current supplied through the thirteenth transistor T13 is charged in the first bootstrap capacitor CQ.

One end of the first bootstrap capacitor CQB is connected to the second high-level voltage line and the other end is connected to the node QB. Current corresponding to a voltage according to a difference between the second high-level voltage VGH2 supplied through the second high-level voltage line and the electric potential of the node QB is charged in the second bootstrap capacitor CQB.

The first scan signal generator 15b may include a third transistor T3, a fourth transistor T4 and a fourteenth transistor T14 which constitute an output unit.

The fourteenth transistor T14 includes a gate electrode connected to the second low-level voltage line, a source electrode connected to node Q' of the logic signal generator 15a, and a drain electrode connected to a gate electrode of the third transistor T3. The fourteenth transistor T14 is turned on all the time according to the second low-level voltage VGL2 supplied through the low-level voltage line to transfer the logic voltage of the node Q' of the logic signal generator 15a to the gate electrode of the third transistor T3. That is, the fourteenth transistor T14 causes the logic voltage applied to the gate electrode of the third transistor T3 to be consistent with the electric potential of the node Q of the logic signal generator 15a. The fourteenth transistor T14 is one of a signal transmission transistor. The fourteenth transistor T14 may be omitted.

The third transistor T3 includes a gate electrode connected to the drain electrode of the fourteenth transistor T14, a source electrode connected to the first high-level voltage line, and a drain electrode connected to an output node for the first scan signal SC1. The third transistor T3 is turned on or turned off in response to the electric potential of the node Q of the logic signal generator 15a transferred through the gate electrode to output the first high-level voltage VGH1 supplied through the first high-level voltage line through the output node for the first scan signal SC1 or to block the first high-level voltage VGH1.

The fourth transistor T4 includes a gate electrode connected to the node QB of the logic signal generator 15a, a source electrode connected to the first low-level voltage line, and a drain electrode connected to the output node for the first scan signal SC1. The fourth transistor T4 is turned on or turned off in response to the electric potential of the node QB of the logic signal generator 15a transferred through the gate electrode to output the first low-level voltage VGL1 supplied through the first low-level voltage line through the output node for the first scan signal SC1 or to block the first low-level voltage VGL1.

The second scan signal generator 15c may include fifth and sixth transistors T5 and T6, a fifteenth transistor T15, and a third bootstrap capacitor CQ_SC2 which constitute an output unit.

The fifteenth transistor T15 includes a gate electrode connected to the second low-level voltage line, a source electrode connected to node Q' of the logic signal generator 15a, and a drain electrode connected to a gate electrode of the fifth transistor T5. The fifteenth transistor T15 is one of a signal transmission transistor. The fifteenth transistor T15 is turned on all the time according to the second low-level voltage VGL2 supplied through the low-level voltage line to transfer the logic voltage of the node Q' of the logic signal generator 15a to the gate electrode of the fifth transistor T5. That is, the fifteenth transistor T15 causes the logic voltage applied to the gate electrode of the fifth transistor T5 to be consistent with the electric potential of the node Q of the logic signal generator 15a.

The fifth transistor T5 includes a gate electrode connected to the drain electrode of the fifteenth transistor T15, a source electrode is connected to a fourth clock line, and a drain electrode connected to an output node for the second scan signal SC2. The fifth transistor T5 is turned on or turned off in response to the electric potential of the node Q of the logic signal generator 15a transferred through the gate electrode to output a logic voltage of a fourth clock signal CLK4 through the output node for the second scan signal SC2 or to block the fourth clock signal CLK4.

The sixth transistor T6 includes a gate electrode connected to the node QB of the logic signal generator 15a, a source electrode connected to the second high-level voltage line, and a drain electrode connected to the output node for the second scan signal SC2. The sixth transistor T6 is turned on or turned off in response to the electric potential of the node QB of the logic signal generator 15a transferred through the gate electrode to output the second high-level voltage VGH2 supplied through the second high-level voltage line through the output node for the second scan signal SC2 or block the second high-level voltage VGH2.

When the first scan transistor ST1 is implemented as an oxide semiconductor transistor and the second scan transistor ST2 is implemented as a polysilicon transistor in the circuit configured as shown in FIG. 2, they use separate low-level voltages VGL because their low-level voltages are different. For example, the first low-level voltage VGL1 is used as a low-level voltage VGL provided to the first scan transistor ST1 and the second low-level voltage VGL2 is used as a low-level voltage VGL provided to the second scan transistor ST2. That is, in the second scan signal generator 15c, the second low-level voltage VLG2 is used as both the start pulse signal VST and a clock signal CLK because the clock signal CLK is output. When the first scan signal generator 15b and the second scan signal generator 15c are integrated as in the present disclosure, for example, when the second low-level voltage VGL2 of −10V is applied to the node QB QB-node of the first scan signal generator 15b and the first low-level voltage VGL1 provided to the first scan signal generator 15b is −6V, a drain-source voltage Vgs of the fourth transistor T4 is applied as "4V" and thus delay can be improved.

Figure 5A:
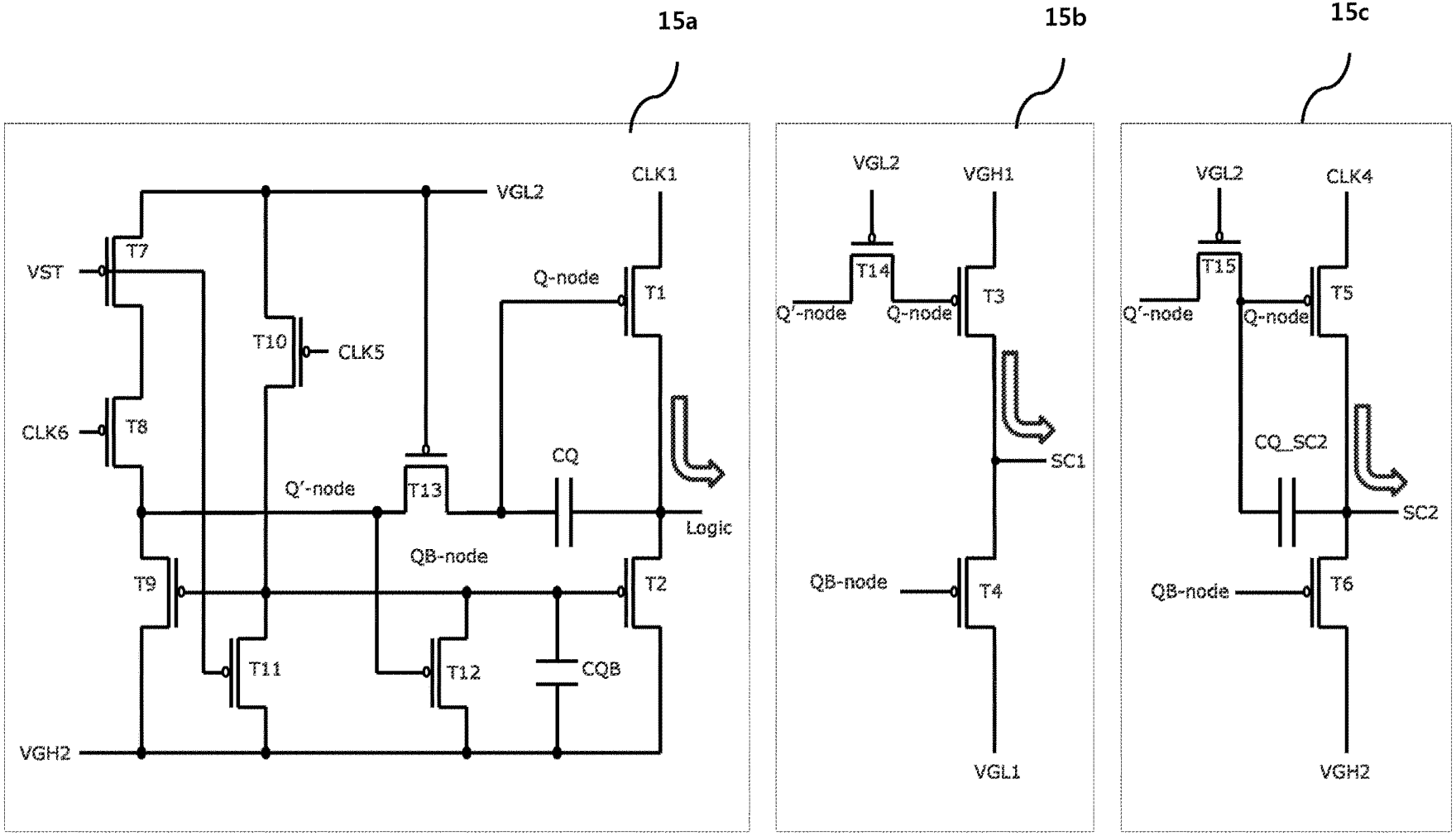
FIG. 5A is a circuit diagram showing an output logic signal of the gate driving circuit when a start pulse and a sixth clock indicate a low-level voltage and FIG. 5B is a waveform diagram at this time according to an embodiment of the present disclosure.
Figure 5B:
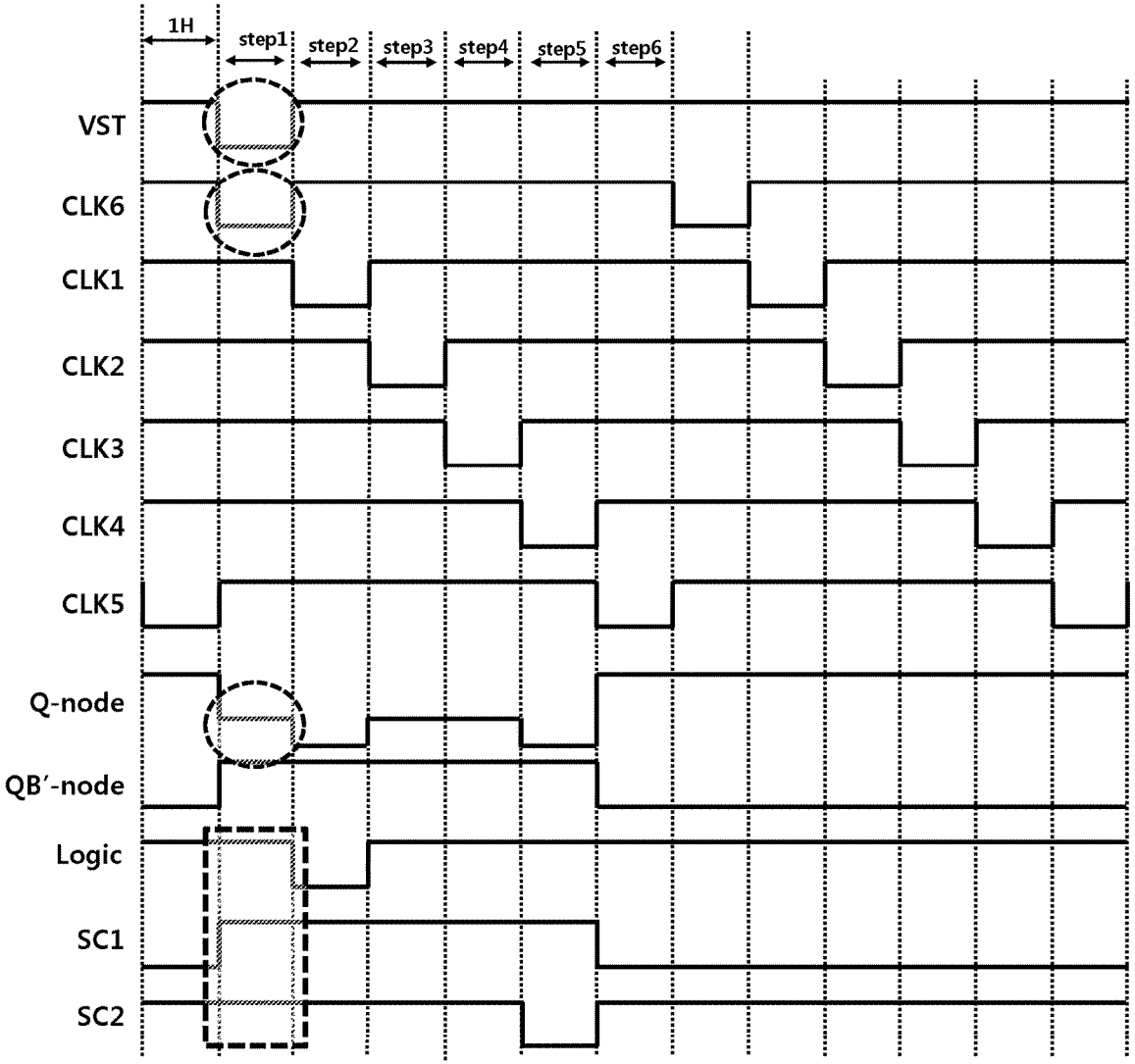

FIG. 5A is a circuit diagram showing output signals of the logic signal generator 15a, the first scan signal generator 15b and the second scan signal generator 15c when the start pulse signal VST and the sixth clock signal CLK6 represent a low-level voltage VL for a period "step 1" and FIG. 5B is a waveform diagram at this time.

As shown in FIG. 5B, the start pulse signal VST and the sixth clock signal CLK6 represent the low-level voltage VL in step 1.

The seventh transistor T7 of the logic signal generator 15a is turned on by receiving the start pulse signal VST through the gate electrode and transfers the second low-level voltage VGL2 supplied through the second low-level voltage line through the drain electrode. The eighth transistor T8 is turned on by receiving the sixth clock signal CLK6 through the gate electrode to transfer the second low-level voltage VGL2 to the node Q'. In this case, since the thirteenth transistor T13 is turned on all the time, the node Q has the low-level voltage and thus the first transistor T1 is turned on. The first transistor T1 is turned on and thus the carry output Logic has the high-level voltage of the first clock signal CLK1. The twelfth transistor T12 is turned on by the second low-level voltage VGL2 applied to the gate electrode to transfer the second high-level voltage VGH2 to the node QB. In this case, the node QB has the high-level voltage and thus the second transistor T2 maintains a turn-off state.

The fourteenth transistor T14 of the first scan signal generator 15b is turned on by the second low-level voltage VGL2 supplied to the gate electrode to transfer the low-level voltage of the node Q of the logic signal generator 15a to the gate electrode of the third transistor T3. The third transistor T3 is turned on by the low-level voltage of the node Q applied to the gate electrode. The third transistor T3 transfers the first high-level voltage VGH1 supplied to the source electrode to the drain electrode to output the high-level voltage VH as the first scan signal SC1. In this case, since the high-level voltage of the node QB of the logic signal generator 15a is provided to the gate electrode of the fourth transistor T4, the fourth transistor T4 maintains a turn-off state.

The fifteenth transistor T15 of the second scan signal generator 15c is turned on by the second low-level voltage VGL2 supplied to the gate electrode to transfer the low-level voltage of the node Q of the logic signal generator 15a to the gate electrode of the fifth transistor T5. The fifth transistor T5 is turned on by the low-level voltage of the node Q applied to the gate electrode. The fifth transistor T5 transfers the high-level voltage supplied to the source electrode and transferred through the fourth clock line to the drain electrode to output the high-level voltage as the second scan signal SC2. In this case, since the high-level voltage of the node QB of the logic signal generator 15a is provided to the gate electrode of the sixth transistor T6, the sixth transistor T6 maintains a turn-off state.

Accordingly, the node Q is charged to the low-level voltage upon synchronization of the start pulse signal VST with the sixth clock signal CLK6 in step 1, and the initialization period ① starts upon output of the high-level voltage as the first scan signal SC1.

Figure 6A:
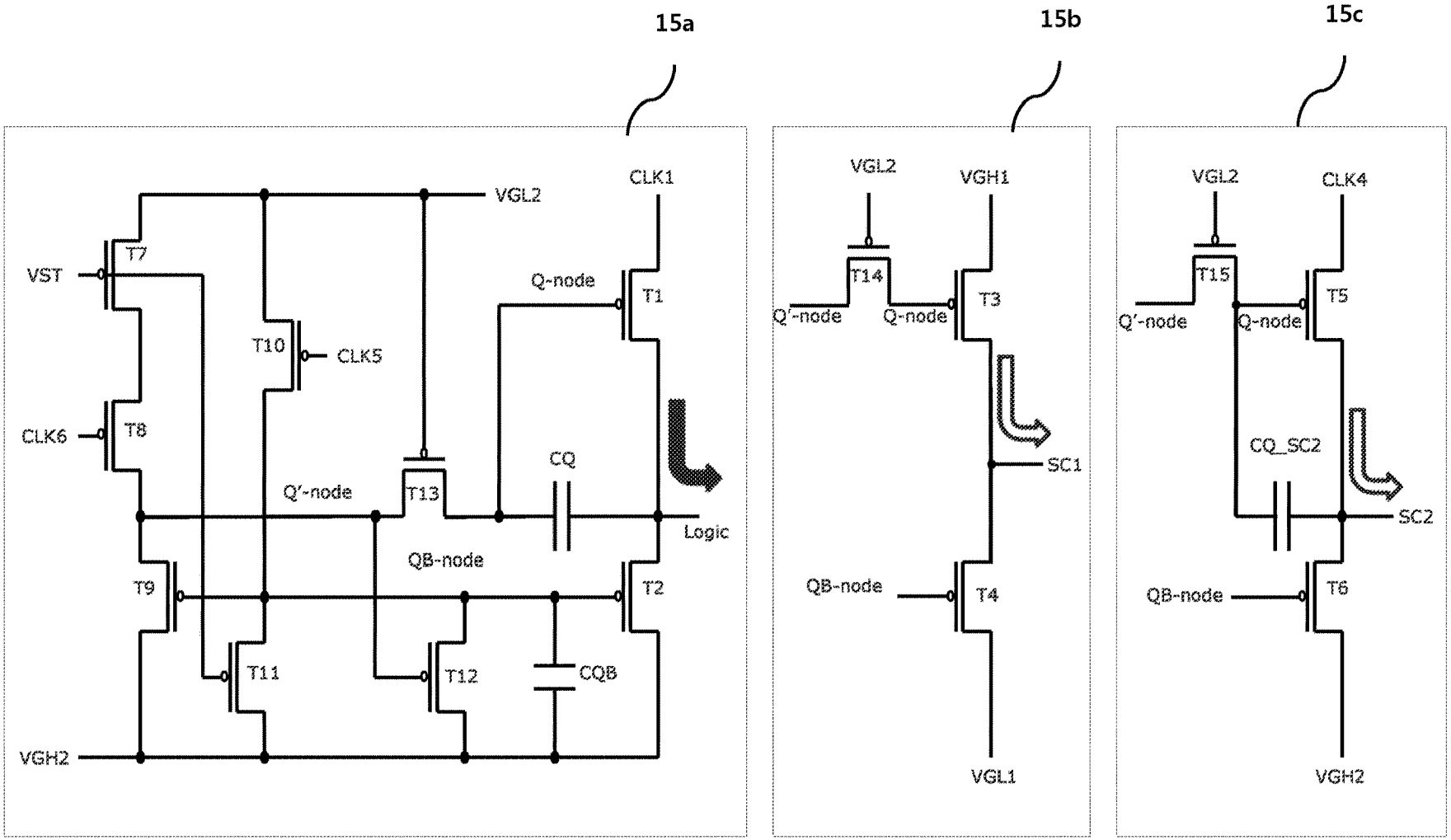
FIG. 6A is a circuit diagram showing an output logic signal of the gate driving circuit when a first clock indicates the low-level voltage and FIG. 6B is a waveform diagram at this time according to an embodiment of the present disclosure.
Figure 6B:
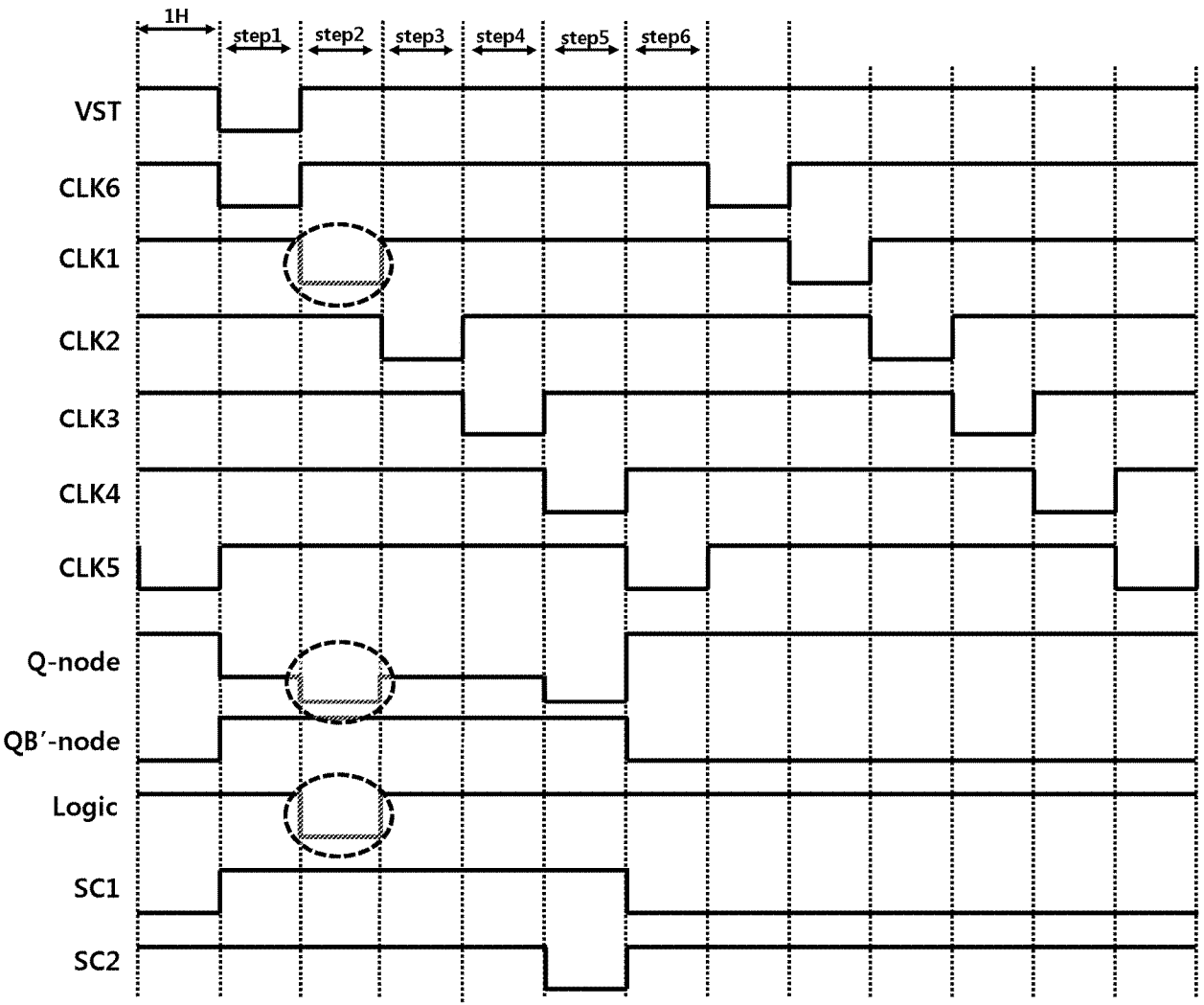

FIG. 6A is a circuit diagram showing output signals of the logic signal generator 15a, the first scan signal generator 15b and the second scan signal generator 15c when the first clock signal CLK1 represents the low-level voltage VL for a period "step 2" and FIG. 6B is a waveform diagram at this time.

As shown in FIG. 6B, the start pulse signal VST and the sixth clock signal CLK6 are high-level voltages and the first clock signal CLK1 is the low-level voltage in step 2.

Since the start pulse signal VST and the sixth clock signal CLK6 switch to the high-level voltage, the seventh transistor T7, the eighth transistor T8 and the eleventh transistor T11 are turned off. The node Q' is floated to the low-level voltage. The thirteenth transistor T13 receiving the second low-level voltage VGL2 through the gate electrode maintains a turn-on state, and thus the node Q represents the low-level voltage. As the voltage charged in the first bootstrap capacitor CQ is discharged, the voltage of the node Q has a voltage value lower than the low-level voltage. Since the node Q' represents the low-level voltage in a floating state, the twelfth transistor T12 is turned on. The second transistor T2 maintains a turn-off state because the node QB is provided with the second high-level voltage VGH2 through the source electrodes of the eleventh transistor T11 and the twelfth transistor T12. The first transistor T1 is turned on by the low-level voltage applied to the gate electrode. The first transistor T1 outputs the low-level voltage of the first clock signal CLK1 supplied to the source electrode to the output terminal through the drain electrode. The output signal Logic of the logic signal generator 15a switches to the low-level voltage.

The third transistor T3 of the first scan signal generator 15b is turned on by the low-level voltage of the node Q applied to the gate electrode. The third transistor T3 outputs the first high-level voltage VGH1 supplied to the source electrode as the first scan signal SC1. In this case, since the high-level voltage of the node QB is provided to the gate electrode of the fourth transistor T4 of the first scan signal generator 15b, the fourth transistor T4 maintains a turn-off state.

The fifteenth transistor T15 of the second scan signal generator 15c maintains a turn-on state according to the second low-level voltage VGH2 supplied to the gate electrode and the node Q represents the low-level voltage. The fifth transistor T5 is turned on by the low-level voltage of the node Q supplied to the gate electrode. The fifth transistor T5 outputs the fourth clock signal CLK4 having the high-level voltage supplied to the source electrode as the second scan signal SC2. In this case, since the high-level voltage of the node QB is supplied to the gate electrode of the sixth transistor T6, the sixth transistor T6 maintains a turn-off state.

The output signal SC2 of the second scan signal generator 15c is synchronized with the fourth clock signal CLK4. Accordingly, the output signals of the first scan signal generator 15b and the second scan signal generator 5c maintain a floating state in periods "step 3" and "step 4". That is, since the output signal SC1 of the first scan signal generator 15b is the high-level voltage and the output signal SC2 of the second scan signal generator 15c maintains the low-level voltage when the second clock signal CLK2 and the third clock signal CLK3 are at the low-level voltage, there is no phase change. In step 5 in which the fourth clock signal CLK4 is toggled, the second scan signal generator 15c outputs the second scan signal SC2.

Figure 7A:
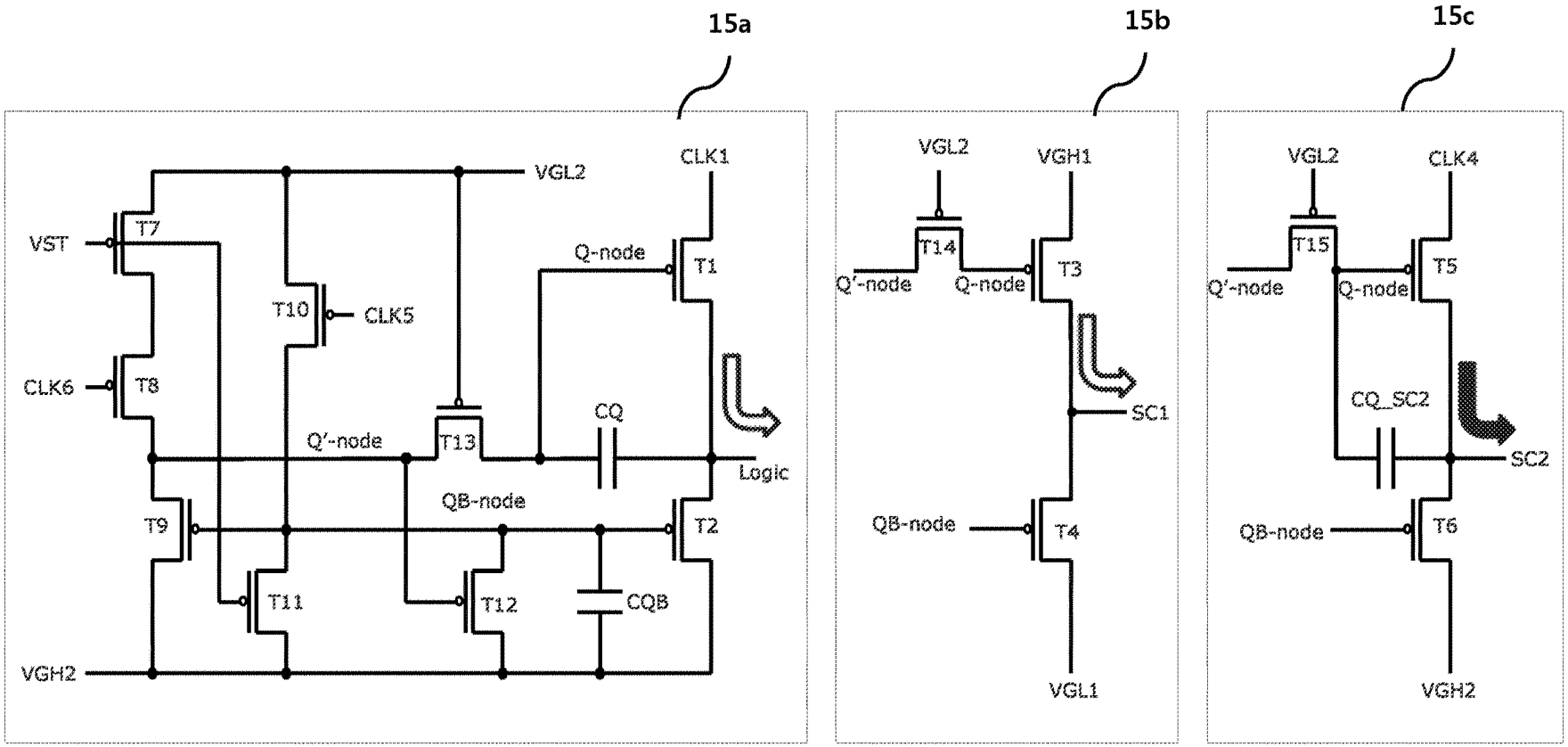
FIG. 7A is a circuit diagram showing an output logic signal of the gate driving circuit when a fourth clock indicates the low-level voltage and FIG. 7B is a waveform diagram at this time according to an embodiment of the present disclosure.
Figure 7B:
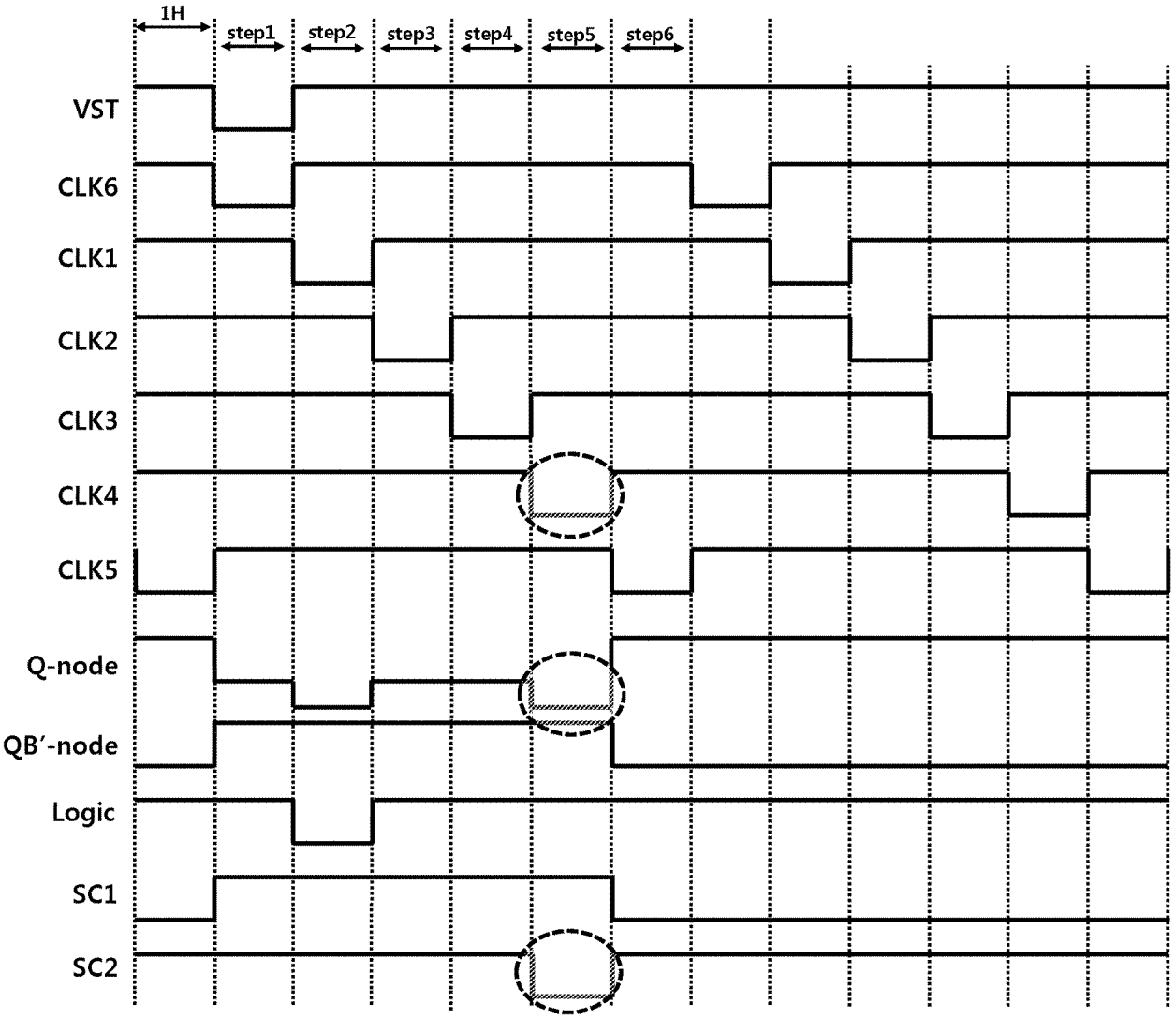

FIG. 7A is a circuit diagram showing output logic signals of the logic signal generator 15a, the first scan signal generator 15b and the second scan signal generator 15c when the fourth clock signal CLK4 represents the low-level voltage VL for a period "step 5" and FIG. 7B is a waveform diagram at this time.

As shown in FIG. 7B, the fourth clock signal CLK4 is the low-level voltage in step 5. Here, the seventh transistor T7, the eighth transistor T8 and the eleventh transistor T11 maintain a turn-off state because the start pulse signal VST and the sixth clock signal CLK6 maintain the high-level voltage. The electric potential of the node Q' is the low-level voltage and thus the node Q' maintains a floating state.

The thirteenth transistor T13 is turned on because the second low-level voltage VGL2 is supplied to the gate electrode of the thirteenth transistor T13 and thus the electric potential of the node Q is the low-level voltage.

Since the electric potential of the node Q' in the floating state is the low-level voltage, the twelfth transistor T12 is turned on and thus the node QB switches to the high-level voltage according to the second high-level voltage VGH2 provided through the source electrodes of the eleventh transistor T11 and the twelfth transistor T12 and the second transistor T2 maintains a turn-off state.

Since the first transistor T1 is turned on by the low-level voltage applied to the gate electrode, the first clock signal CLK1 having the high-level voltage applied to the source electrode is output through the drain electrode of the first transistor T1. Accordingly, the output signal of the logic signal generator 15a represents the high-level voltage. Here, since the high-level voltage of the node QB is provided to the gate electrode of the second transistor T2, the second transistor T2 maintains a turn-off state.

The third transistor T3 of the first scan signal generator 15b is turned on by the low-level voltage VL of the node Q applied to the gate electrode. The third transistor T3 is turned on to output the first high-level voltage VGH1 supplied to the source electrode through the drain electrode. Since the high-level voltage of the node QB is provided to the gate electrode of the fourth transistor T4, the fourth transistor T4 maintains a turn-off state.

The fifteenth transistor T15 of the second scan signal generator 15c maintains a turn-on state according to the second low-level voltage VGL2 supplied to the gate electrode and thus the node Q represents the low-level voltage. The fifth transistor T5 is turned on by the low-level voltage of the node Q applied to the gate electrode. The fifth transistor T5 outputs the fourth clock signal CLK4 at the low-level voltage input through the source electrode through the drain electrode as the second scan signal SC2. Since the high-level voltage of the node QB is provided to the gate electrode of the sixth transistor T6, the sixth transistor T6 maintains a turn-off state.

Figure 8A:
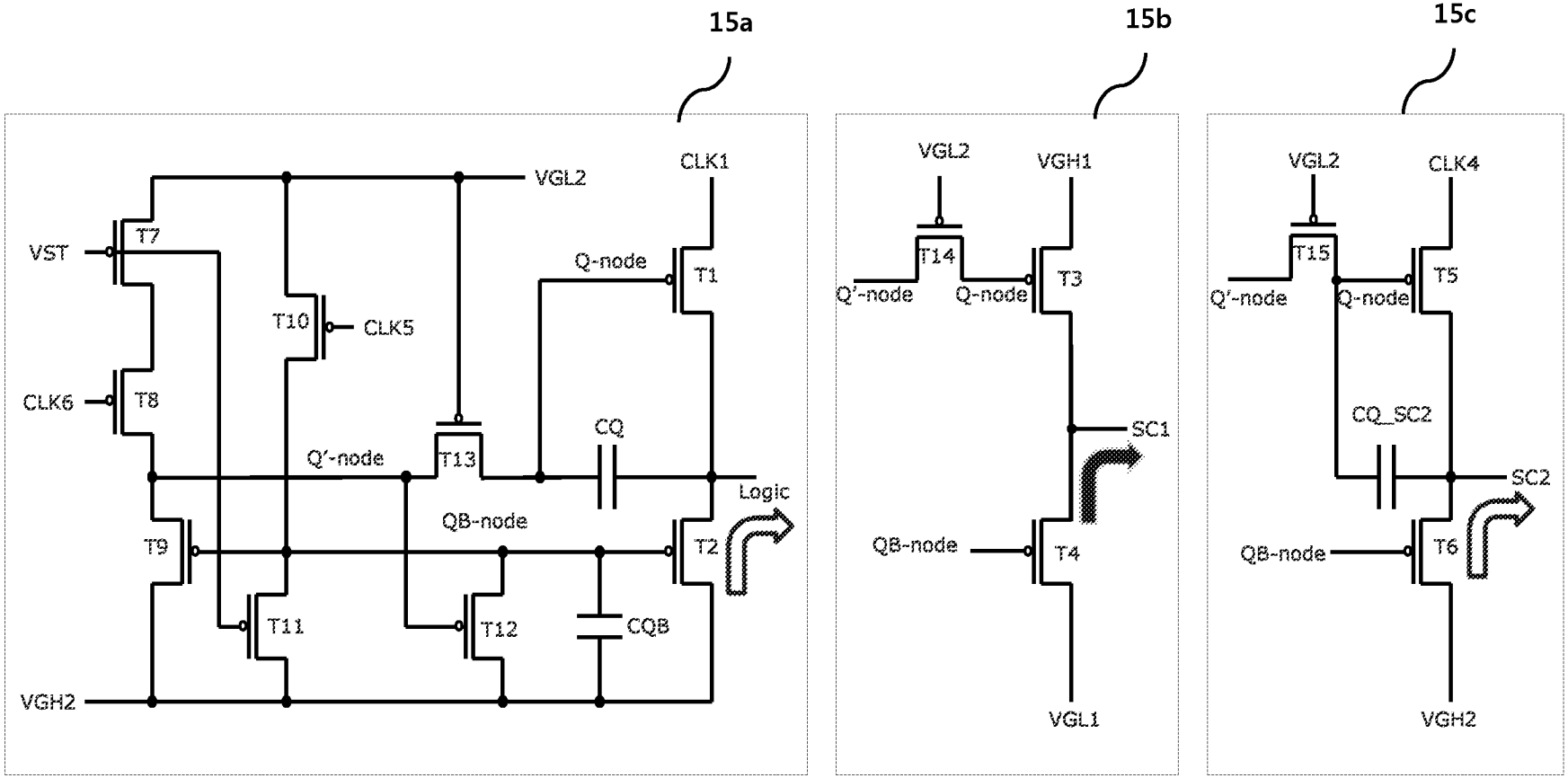
FIG. 8A is a circuit diagram showing an output logic signal of the gate driving circuit when a fifth clock indicates the low-level voltage and FIG. 8B is a waveform diagram at this time according to an embodiment of the present disclosure.
Figure 8B:
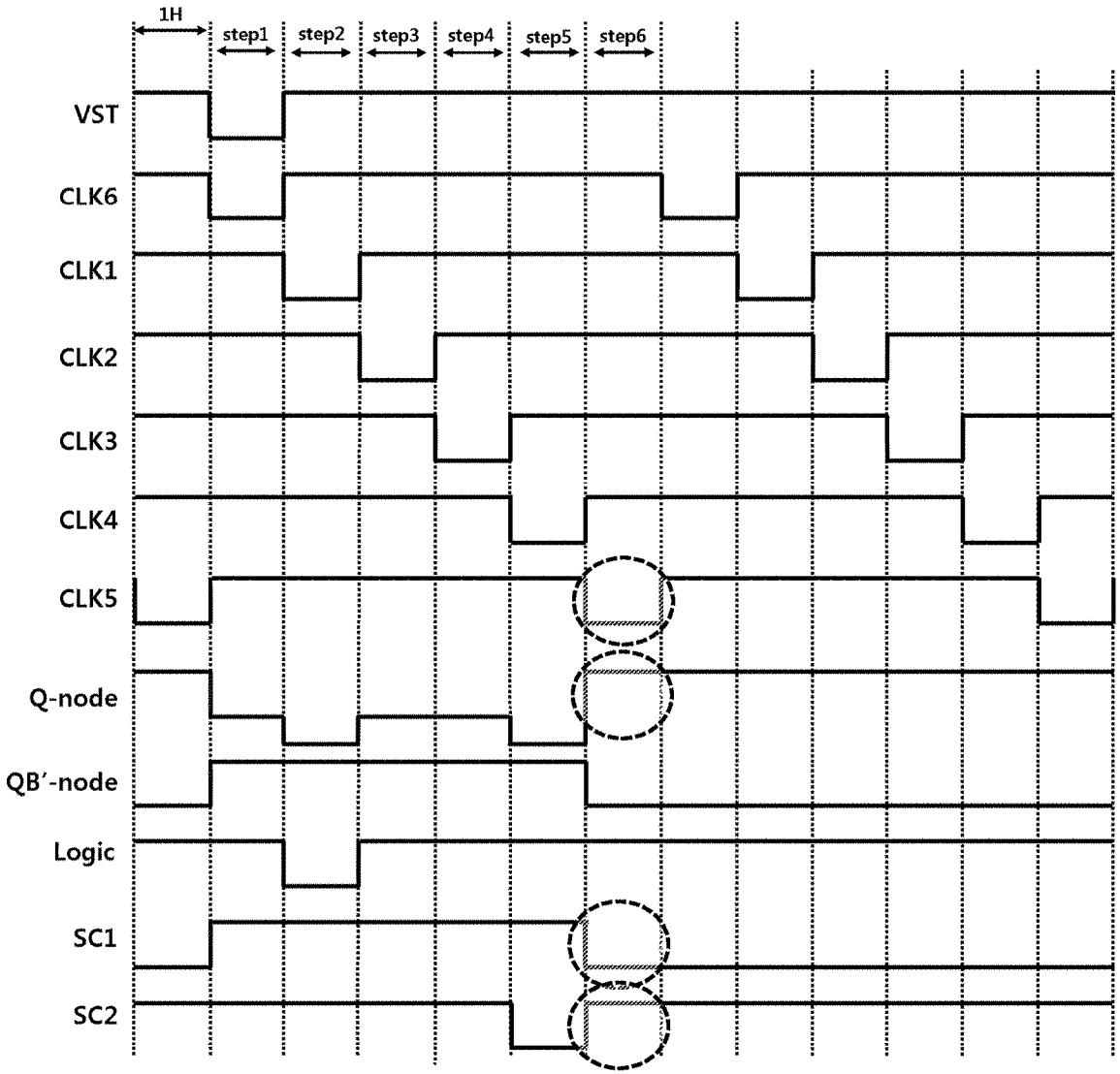

FIG. 8A is a circuit diagram showing output signals of the logic signal generator 15a, the first scan signal generator 15b and the second scan signal generator 15c when the fifth clock signal CLK5 represents the low-level voltage VL for a period "step 6" and FIG. 8B is a waveform diagram at this time.

As shown in FIG. 8B, the seventh transistor T7, the eighth transistor T8 and the eleventh transistor T11 maintain a turn-off state because the start pulse signal VST and the sixth clock signal CLK6 maintain the high-level voltage for the period "step 6".

The tenth transistor T10 is turned on by the fifth clock signal CLK5 at the low-level voltage supplied to the gate electrode. Since the tenth transistor T10 is provided with the second low-level voltage VGL2 through the source electrode and transfers the second low-level voltage VGL2 to the node QB connected to the drain electrode, the electric potential of the node QB changes to the low-level voltage.

The ninth transistor T9 is turned on because the electric potential of the node QB connected to the gate electrode of the ninth transistor T9 changes to the low-level voltage. The ninth transistor T9 receives the second high-level voltage VGH2 through the source electrode and provides the second high-level voltage VGH2 to the node Q' connected to the drain electrode. Since the electric potential of the node Q' switches to the high-level voltage, the electric potential of the node Q switches to the high-level voltage. Since the electric potential of the node Q' is the high-level voltage, the twelfth transistor T12 is turned off. The electric potential of the node Q also switches to the high-level voltage because the electric potential of the node Q' is the high-level voltage, and thus the first transistor T1 is turned off.

Since the tenth transistor T10 is turned on and thus the electric potential of the node QB switches to the low-level voltage, the second transistor T2 is turned on. The second transistor T2 outputs the second high-level voltage VGH2 supplied through the source electrode through the drain electrode. In this case, the output electric potential of the logic signal generator 15a is the high-level voltage.

The third transistor T3 of the first scan signal generator 15b is turned off because the high-level voltage of the node Q is applied to the gate electrode of the third transistor T3. In this case, the fourth transistor T4 is turned on because the low-level voltage of the node QB is applied to the gate electrode of the fourth transistor T4. The fourth transistor T4 receives the first low-level voltage VGL1 through the source electrode and outputs the first scan signal SC1 at the low-level voltage through the drain electrode.

The fifteenth transistor T15 of the second scan signal generator 15c maintains a turn-on state according to the second low-level voltage VGL2 supplied to the gate electrode, and the node Q switches to the high-level voltage because the electric potential of the node Q' is the high-level voltage. The fifth transistor T5 is turned off because the high-level voltage is supplied to the gate electrode. In this case, the sixth transistor T6 is turned on by receiving the low-level voltage of the node QB through the gate electrode. The sixth transistor T6 outputs the second high-level voltage VGH2 supplied to the source electrode as the second scan signal SC2 through the drain electrode.

Figure 9:
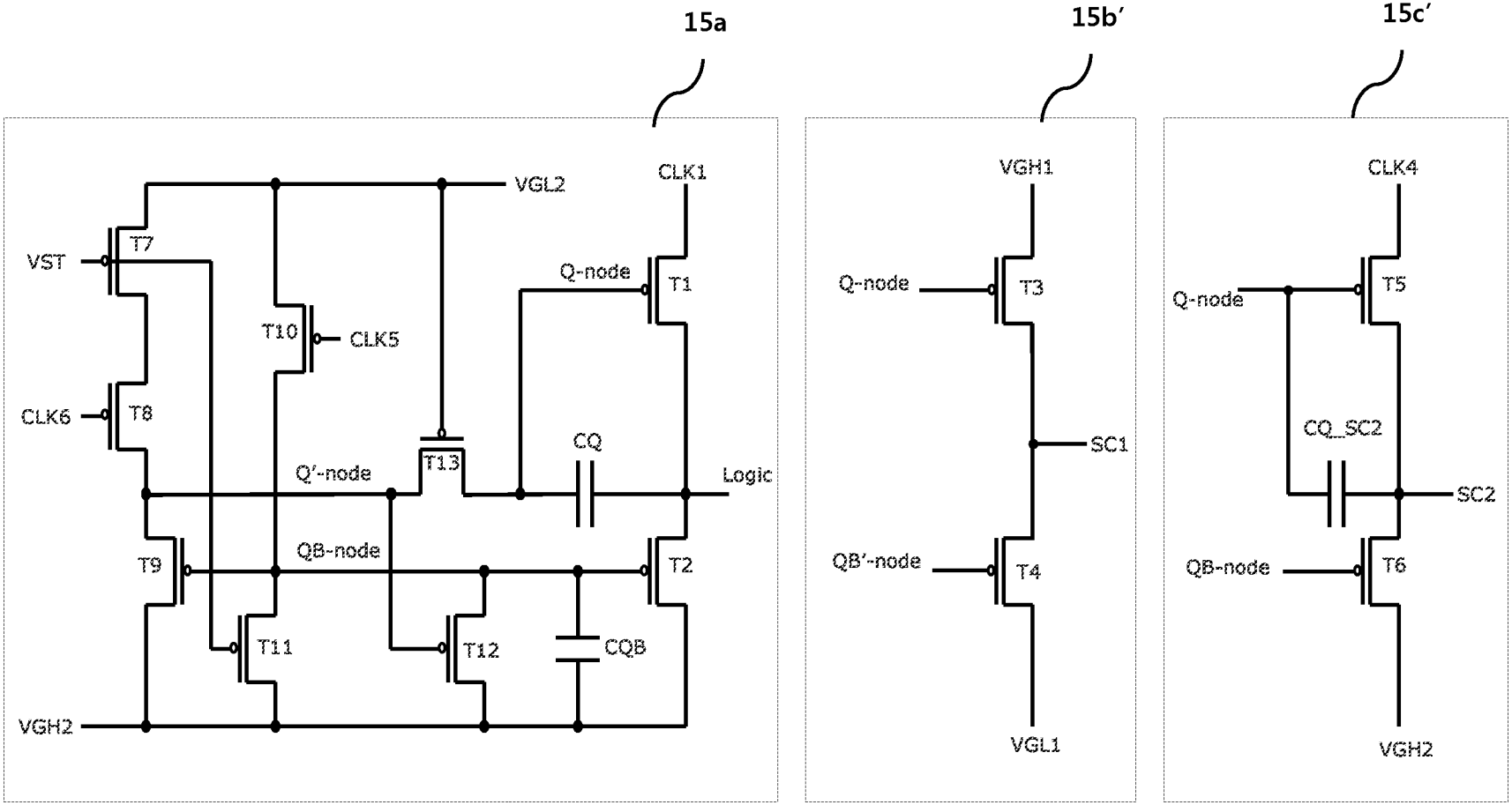
FIG. 9 shows a gate driving circuit according to another embodiment of the present disclosure.

FIG. 9 shows a gate driving circuit according to another embodiment of the present disclosure. A first scan signal generator 15b' and a second scan signal generator 15c' according to another embodiment differ from the first scan signal generator 15b and the second scan signal generator 15c of FIG. 4 in that the fourteenth transistor T14 and the fifteenth transistor T15 that are turned on all the time by receiving the second low-level voltage VGL2 through the gate electrodes thereof are not provided.

Since the fourteenth transistor T14 and the fifteenth transistor T15 are components for preventing the voltage of the node Q' connected to the source electrodes from leaking by being turned on all the time by receiving the second low-level voltage VGL2 through the gate electrodes thereof, they may be omitted in the embodiment of FIG. 9.

The logic signal generator 15a has the same configuration and operation as those in the embodiment of FIG. 4 and thus description thereof is omitted.

Although an example of generating a logic signal, that is, a carry signal, using 6-phase clock signals has been described in the present embodiment, an initialization time of 7 horizontal periods 7H of the first scan signal SC1 may be secured as shown in FIG. 2B (B) in an embodiment in which a carry signal is generated using 8-phase clock signals.

In a circuit including both an oxide semiconductor transistor and a polysilicon transistor in a pixel driving circuit, initialization operation is performed in a driver provided in a gate-in-panel (GIP) instead of being performed according to a DC voltage. Here, delay is generated during initial charging of the second node DTD between the source electrode of the driving transistor DT and the anode of the organic light emitting diode EL. Accordingly, a long initialization time of about 4H, for example, is required. As described above, the gate driving circuit according to the present disclosure can secure an initialization time of 4 horizontal periods 4H using 6-phase clock signals CLK1 to CLK6. Furthermore, the gate driving circuit according to the present disclosure can reduce a bezel size since the first scan signal generator and the second scan signal generator are integrated into a single scan signal generator.

Although preferred embodiments of the present disclosure have been described above, it will be apparent to those skilled in the art that various modifications and variations can be made in the present disclosure without departing from the spirit or scope of the disclosure.

What is claimed is:

1. A gate driving circuit comprising:

a logic signal generator including a first node and a second node outputting a logic signal reverse to a logic signal of the first node and outputting a carry signal; and a scan signal generator including a first scan signal generator and a second scan signal generator, wherein the first scan signal generator generates a first scan signal *and the second scan signal generator generates a second scan signal* for applying a data voltage to *one or more* driving transistors of *one or more* pixel circuits for an initialization time by sharing the first node and the second node of the logic signal generator, and wherein [the second scan signal generator generates a] second scan signal [that] is a same logic voltage signal as the first scan signal for the initialization time [and is a logic voltage signal reverse to the first scan signal for a sampling time by sharing the first node and the second node of the logic signal generator].

[2. The gate driving circuit of claim 1, wherein an initialization time of 4 horizontal periods and a sampling time of 1 horizontal period are provided using 6-phase clock signals.]

[3. The gate driving circuit of claim 1, wherein an initialization time of 6 horizontal periods and a sampling time of 1 horizontal period are provided using 8-phase clock signals.]

[4. The gate driving circuit of claim 1, wherein the logic signal generator includes a first transistor having a gate electrode connected to the first node and a second transistor serially connected to the first transistor and having a gate electrode connected to the second node and outputs a carry pulse signal through a node shared by the first transistor and the second transistor;

wherein the first scan signal generator includes a third transistor having a gate electrode connected to the first node and a fourth transistor serially connected to the third transistor and having a gate electrode connected to the second node and outputs the first scan signal through a node shared by the third transistor and the fourth transistor; and wherein the second scan signal generator includes a fifth transistor having a gate electrode connected to the first node and a sixth transistor serially connected to the fifth transistor and having a gate electrode connected to the second node and outputs the second scan signal through a node shared by the fifth transistor and the sixth transistor.]

[5. The gate driving circuit of claim 4, wherein the first to sixth transistors are p-type transistors.]

[6. The gate driving circuit of claim 4, wherein a first clock signal is supplied to one terminal of the first transistor, a second high-level voltage is supplied to one terminal of the second transistor, a first high-level voltage is supplied to one terminal of the third transistor, a first low-level voltage is supplied to one terminal of the fourth transistor, a fourth clock signal is supplied to one terminal of the fifth transistor, and the second high-level voltage is supplied to one terminal of the sixth transistor.]

[7. The gate driving circuit of claim 6, wherein a capacitor is disposed between a connecting point of the first node and the gate electrode of the fifth transistor and the node shared by the fifth transistor and the sixth transistor.]

[8. The gate driving circuit of claim 7, wherein the first scan signal generator includes a first signal transmission transistor having a source electrode connected to the first node and a drain electrode connected to the gate electrode of the third transistor and turned on all the time by receiving a second low-level voltage through a gate electrode, and wherein the second scan signal generator includes a second signal transmission transistor having a source electrode connected to the first node and a drain electrode connected to the gate electrode of the fifth transistor and turned on all the time by receiving the second low-level voltage through a gate electrode.]

[9. The gate driving circuit of claim 4, wherein the logic signal generator, the first scan signal generator and the second scan signal generator output a high-level voltage when first to fifth clock signals are a low-level voltage and a start pulse signal and a sixth clock signal are the low-level voltage, the logic signal generator outputs the low-level voltage and the first scan signal generator and the second scan signal generator output the high-level voltage when the first clock signal is the low-level voltage and the start pulse signal and the second to sixth clock signals are the high-level voltage, the logic signal generator and the first scan signal generator output the high-level voltage and the second scan signal generator outputs the high-level voltage when the fourth clock signal is the low-level voltage and the start pulse signal, the first to third clock signals and the fifth and sixth clock signals are the high-level voltage, and the logic signal generator and the second scan signal generator output the high-level voltage and the first scan signal generator outputs the low-level voltage when the fifth clock signal is the low-level voltage and the start pulse signal, the first to fourth clock signals and the sixth clock signal are the high-level voltage.]

[10. A display device comprising:

a substrate including a display area and a non-display area;

pixel circuits each including a driving transistor for transferring current necessary to operate a light-emitting diode according to a switching operation and arranged in the display area; and the gate driving circuit according to claim 1 included in the non-display area.]

[11. The display device of claim 10, wherein each pixel circuit includes at least one oxide semiconductor transistor and at least one polysilicon transistor.]

[12. The display device of claim 10, wherein each pixel circuit includes a first scan transistor configured to receive a first scan signal and apply the first scan signal to a gate electrode of the driving transistor, and a second scan transistor configured to receive a second scan signal and perform a switching operation for compensating for the driving transistor.]

[13. The display device of claim 12, wherein the first scan transistor is an oxide transistor and the second scan transistor is a silicon transistor.]

[14. The display device of claim 12, wherein the driving transistor is an oxide transistor.]

[15. The display device of claim 12, wherein the driving transistor is a silicon transistor.]

[16. The display device of claim 12, wherein the driving transistor has a channel formed of a semiconductor oxide.]

[17. The display device of claim 12, wherein the second scan transistor is a p-type metal-oxide-semiconductor silicon transistor.]

[18. The display device of claim 12, wherein the second scan transistor is an n-type metal-oxide-semiconductor silicon transistor.]

*19. The gate driving circuit of claim 1, wherein the second scan signal is a logic voltage signal that is opposite to the first scan signal during a sampling time.*

*20. The gate driving circuit of claim 1, wherein the gate driving circuit uses 6-phase clock signals.*

*21. The gate driving circuit of claim 20, wherein an initialization time of 4 horizontal periods and a sampling time of 1 horizontal period are provided using the 6-phase clock signals.*

*22. The gate driving circuit of claim 20, wherein the logic signal generator outputs the carry signal based on a start pulse signal having a voltage level that is a same as a voltage level of at least one of the 6-phase clock signals.*

*23. The gate driving circuit of claim 1, wherein the logic signal generator includes a first transistor and a second transistor that is serially connected to the first transistor at a first output node, the first transistor having a gate electrode connected to the first node and the second transistor having a gate electrode that is connected to the second node, the logic signal generator configured to output a carry signal at the first output node.*

*24. The gate driving circuit of claim 1, wherein the first scan signal generator includes a third transistor and a fourth transistor that is serially connected to the third transistor at a second output node, the third transistor having a gate electrode connected to the first node and the fourth transistor having a gate electrode connected to the second node, the first scan signal generator configured to output the first scan signal at the second output node.*

*25. The gate driving circuit of claim 1, wherein the second scan signal generator includes a fifth transistor and a sixth transistor that is serially connected to the fifth transistor at a third output node, the fifth transistor having a gate electrode connected to the first node and the sixth transistor having a gate electrode connected to the second node, the second scan signal generator configured to output the second scan signal at the third output node.*

*26. The gate driving circuit of claim 23, wherein the logic signal generator further comprises a first capacitor having a first electrode and a second electrode, the first electrode of the first capacitor connected to the first node and the second*

*electrode of the first capacitor connected to the first output node of the logic signal generator.*

*27. The gate driving circuit if claim 25, wherein the second scan signal generator further includes a second capacitor having a first electrode and a second electrode, the first electrode of the second capacitor connected to the gate electrode of the fifth transistor and the second electrode of the second capacitor connected to the third output node of the second scan signal generator.*

*28. The gate driving circuit of claim 1, wherein the first scan signal generator is configured to generate the first scan signal based on a first high-level voltage, and the second scan signal generator is configured to generate the second scan signal based on a second high-level voltage that is different from the first high-level voltage.*

*29. The gate driving circuit of claim 28, wherein the logic signal generator is configured to generate a carry signal based on the second high-level voltage.*

*30. The gate driving circuit of claim 1, wherein the logic signal generator is configured to start an operation of generating the carry signal based on a start pulse signal.*

*31. A display device comprising:*

*a substrate including a display area and a non-display area;*

*a plurality of pixel circuits in the display area, each pixel circuit of the plurality of pixel circuits including a driving transistor configured to transfer current to operate a light-emitting diode according to a switching operation; and*

*a gate driving circuit in the non-display area, the gate driving circuit including:*

*a logic signal generator including a first node and a second node outputting a logic signal reverse to a logic signal of the first node and outputting a carry signal; and*

*a scan signal generator including a first scan signal generator configured to generate a first scan signal and a second scan signal generator configured to generate a second scan signal for applying a data voltage to one or more driving transistors of one or more pixel circuits of the plurality of pixel circuits for an initialization time,*

*wherein the first scan signal generator and the second scan signal generator respectively generate the first scan signal and the second scan signal by sharing the first node and the second node of the logical signal generator, and*

*wherein the second scan signal is a same logic voltage signal as the first scan signal for the initialization time.*

*32. A display device comprising:*

*a display panel including a plurality of pixel circuits; and*

*a data driving circuit and a scan driving circuit configured to drive the plurality of pixel circuits,*

*wherein each of the plurality of pixel circuits includes an oxide transistor,*

*wherein the scan driving circuit includes a logical signal generator and a scan signal generator, the logic signal generator having a first node and a second node, and*

*wherein the scan signal generator includes a first scan signal generator and a second scan signal generator that are connected to the first node and the second node of the logic signal generator, the first scan signal generator configured to generate a first scan signal and the second scan signal generator configured to generate a second scan signal for applying a data voltage to one or more driving transistors of one or more pixel circuits of the plurality of pixel circuits for an initialization time, and*

*wherein the second scan signal is a same logic voltage signal as the first scan signal for the initialization time.*

*33. The display device of claim 32, wherein each of the plurality of pixel circuits further includes a driving transistor, a first scan transistor configured to receive the first scan signal and apply a data voltage to a gate electrode of the driving transistor, a capacitor configured to store the data voltage, and a second transistor configured to receive the second scan signal and perform a switching operation for compensating for the driving transistor.*

*34. The display device of claim 33, wherein the driving transistor is the oxide transistor.*

*35. The display device of claim 33, wherein one of the first scan transistor and the second scan transistor is an oxide transistor and another one of the first scan transistor and the second scan transistor is a polysilicon transistor.*

*36. The display device of claim 33, wherein the first scan transistor receives the first scan signal during an initialization time, and the second scan transistor receives the second scan signal during a sampling time.*

*37. The display device of claim 36, wherein the initialization time having 4 horizontal periods and the sampling time having 1 horizontal period are provided using 6-phase clock signals.*

*38. The display device of claim 32, wherein the logic signal generator includes a first transistor and a second transistor that is serially connected to the first transistor at a first output node, the first transistor having a gate electrode connected to the first node and the second transistor having a gate electrode that is connected to the second node, the logic signal generator configured to output a carry pulse signal at the first output node.*

*39. The display device of claim 32, wherein the first scan signal generator includes a third transistor and a fourth transistor that is serially connected to the third transistor at a second output node, the third transistor having a gate electrode connected to the first node and the fourth transistor having a gate electrode connected to the second node, the first scan signal generator configured to output the first scan signal at the second output node.*

*40. The display device of claim 32, wherein the second scan signal generator includes a fifth transistor and a sixth transistor that is serially connected to the fifth transistor at a third output node, the fifth transistor having a gate electrode connected to the first node and the sixth transistor having a gate electrode connected to the second node, the second scan signal generator configured to output the second scan signal at the third output node.*

* * * * *